US012794140B2

(12) United States Patent
Oka et al.

(10) Patent No.: US 12,794,140 B2
(45) Date of Patent: Nov. 10, 2026

(54) INTELLIGENT REFLECTING SURFACE

(71) Applicant: Japan Display Inc., Tokyo (JP)

(72) Inventors: Shinichiro Oka, Tokyo (JP); Mitsutaka Okita, Tokyo (JP); Daiichi Suzuki, Tokyo (JP); Shigesumi Araki, Tokyo (JP); Yoshiaki Amano, Fujimino (JP); Hiromi Matsuno, Fujimino (JP)

(73) Assignee: JAPAN DISPLAY INC., Tokyo (JP)

( * ) Notice: Subject to any disclaimer, the term of this patent is extended or adjusted under 35 U.S.C. 154(b) by 338 days.

(21) Appl. No.: 18/477,602

(22) Filed: Sep. 29, 2023

(65) Prior Publication Data

US 2024/0047890 A1 Feb. 8, 2024

Related U.S. Application Data

(63) Continuation of application No. PCT/JP2022/016565, filed on Mar. 31, 2022.

(30) Foreign Application Priority Data

Mar. 31, 2021 (JP) ................................ 2021-060857

(51) Int. Cl.
*H01Q 15/14* (2006.01)
*H01Q 3/36* (2006.01)
*H01Q 21/06* (2006.01)

(52) U.S. Cl.
CPC ............. *H01Q 15/148* (2013.01); *H01Q 3/36* (2013.01); *H01Q 21/065* (2013.01)

(58) Field of Classification Search
CPC ....... H01Q 15/148; H01Q 3/36; H01Q 21/065
USPC .......................... 349/142–144; 345/173–175
See application file for complete search history.

(56) References Cited

U.S. PATENT DOCUMENTS 4,602,850 A * 7/1986 DeBenedetti ............ G09G 3/36 349/111
2005/0168674 A1* 8/2005 Kubo ............... G02F 1/133707 349/114
2011/0285940 A1* 11/2011 Kubota ................ G02F 1/1334 349/86
2017/0220185 A1* 8/2017 Kurasawa ............ G02F 1/1368
2018/0083364 A1 3/2018 Foo
2018/0138593 A1* 5/2018 Nakazawa ............ H01Q 1/125

FOREIGN PATENT DOCUMENTS

JP H11-103201 A 4/1999
JP 2019-530387 A 10/2019

* cited by examiner

*Primary Examiner* — David Y Chung
(74) *Attorney, Agent, or Firm* — XSENSUS LLP

(57) ABSTRACT

According to one embodiment, an intelligent reflecting surface includes a plurality of patch areas including a plurality of square patch electrodes, an electrode shape formed by the patch electrode, a first connection electrode, a second connection electrode, a third connection electrode, and a fourth connection electrode included in each of the plurality of patch areas has rotational symmetry having a point inside each of the plurality of patch areas as a center of rotation, and a first patch area, a second patch, a third patch area, and a fourth patch area have an intersection of the first patch area, the second patch area, the third patch area, and the fourth patch area as a whole as a center of rotation.

17 Claims, 20 Drawing Sheets

INTELLIGENT REFLECTING SURFACE

CROSS-REFERENCE TO RELATED APPLICATIONS

This application is a Continuation Application of PCT Application No. PCT/JP2022/016565, filed Mar. 31, 2022 and based upon and claiming the benefit of priority from Japanese Patent Application No. 2021-060857, filed Mar. 31, 2021, the entire contents of all of which are incorporated herein by reference.

FIELD

Embodiments described herein relate generally to an intelligent reflecting surface.

BACKGROUND

Phase shifters using liquid crystal have been developed as phase shifters for use in phased array antennas whose directivity can be electrically controlled. In a phased array antenna, a plurality of antenna elements to which high-frequency signals are transmitted from corresponding phase shifters are arranged one-dimensionally (or two-dimensionally). In the phased array antenna as described above, the dielectric constant of the liquid crystal needs to be adjusted such that the phase difference between high-frequency signals input to adjacent antenna elements becomes constant.

In addition, intelligent reflecting surfaces capable of controlling a direction of radio wave reflection using the liquid crystal have been studied, similarly to the phased array antennas. On this intelligent reflecting surface, reflection controllers including reflecting electrodes are arranged one-dimensionally (or two-dimensionally). On the intelligent reflecting surface, the dielectric constant of the liquid crystal also needs to be adjusted such that a phase difference of the reflected radio waves becomes constant between the adjacent reflection controllers.

A high frequency can be separated into a horizontally polarized wave which oscillates in the horizontal direction and a vertically polarized wave which oscillates in the vertical direction. If a reflective electrode is asymmetric, the reflection characteristics of the horizontally polarized wave and the reflection characteristics of the vertically polarized wave become different from each other.

DETAILED DESCRIPTION

Figure 1:
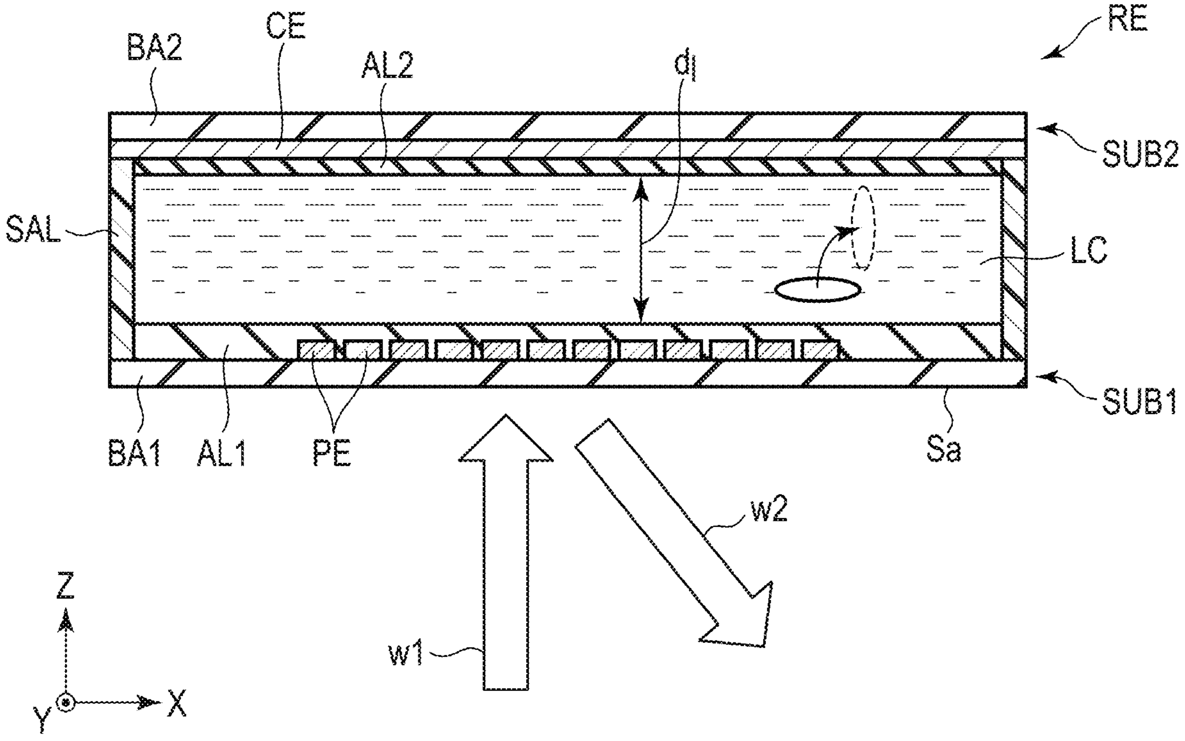
FIG. 1 is a cross-sectional view showing the intelligent reflecting surface of the embodiment.

In general, according to one embodiment, an intelligent reflecting surface comprises a first substrate including a first base, and a plurality of patch areas including a plurality of square patch electrodes arrayed in a matrix at regular intervals along each of a first direction and a second direction;

a second substrate including a second base and a common electrode opposed to the plurality of patch electrodes; and a liquid crystal layer sandwiched between the first substrate and the second substrate, wherein each of the plurality of patch areas includes the patch electrode, a first connection electrode and a third connection electrode which extend parallel to the second direction, and a second connection electrode and a fourth connection electrode which extend parallel to the first direction, the first connection electrode and the third connection electrode are arranged linearly to extend in directions opposite to each other, the second connection electrode and the fourth connection electrode are arranged linearly to extend in directions opposite to each other, an electrode shape formed by the patch electrode, the first connection electrode, the second connection electrode, the third connection electrode, and the fourth connection electrode included in each of the plurality of patch areas has rotational symmetry having a point inside each of the plurality of patch areas as a center of rotation, and a first patch area, a second patch area adjacent to the first patch area in the second direction, a third patch area adjacent to the first patch area in the first direction, and a fourth patch area adjacent to the second patch area in the first direction and adjacent to the third patch area in the second direction, of the plurality of patch areas, have an intersection of the first patch area, the second patch area, the third patch area, and the fourth patch area as a whole as a center of rotation.

According to another embodiment, an intelligent reflecting surface comprises a first substrate including a first base, and a plurality of patch areas including a plurality of square patch electrodes arrayed in a matrix at regular intervals along each of a first direction and a second direction;

a second substrate including a second base and a common electrode opposed to the plurality of patch electrodes; and a liquid crystal layer sandwiched between the first substrate and the second substrate, wherein each of the plurality of patch areas includes the patch electrode, a first connection electrode and a third connection electrode which extend in a direction parallel to the second direction, and a second connection electrode and a fourth connection electrode which extend in a direction parallel to the first direction, the first connection electrode and the third connection electrode are arranged linearly to extend in directions opposite to each other, the second connection electrode and the fourth connection electrode are arranged linearly to extend in directions opposite to each other, a line passing through a center point of the patch electrode and extending along the second direction is referred to as a first imaginary line, and a line passing through the center point and extending along the first direction is referred to as a second imaginary line, and at least one of a condition that the first connection electrode and the third connection electrode do not overlap with the first imaginary line and a condition that the second connection electrode and the fourth connection electrode do not overlap with the second imaginary line is satisfied.

According to yet another embodiment, an intelligent reflecting surface comprises a first substrate including a first base, and a plurality of patch areas including a plurality of square patch electrodes arrayed in a matrix at regular intervals along each of a first direction and a second direction;

a second substrate including a second base and a common electrode opposed to the plurality of patch electrodes; and a liquid crystal layer sandwiched between the first substrate and the second substrate, wherein each of the plurality of patch areas includes the patch electrode, and a first connection electrode and a second connection electrode which extend from vertices of the patch electrode, and the first connection electrode and the second connection electrode are arranged linearly, extend in directions opposite to each other, and overlap with an imaginary line including one of diagonal lines of the patch electrode.

Embodiments described herein aim to provide an intelligent reflecting surface capable of symmetrically reflecting both a horizontally polarized wave and a vertically polarized wave.

Each embodiment of the invention will be described hereinafter with reference to the accompanying drawings. The disclosure is merely an example, and proper changes within the spirit of the invention, which are easily conceivable by a person of ordinary skill in the art, are included in the scope of the invention as a matter of course. In addition, in some cases, in order to make the description clearer, the widths, thicknesses, shapes and the like, of the respective parts are schematically illustrated in the drawings, compared to the actual modes. However, the schematic illustration is merely an example, and adds no restriction to the interpretation of the invention. Besides, in the specification and drawings, the same elements as those described in connection with preceding drawings are denoted by like reference numbers, and a detailed description thereof is omitted unless necessary.

The embodiments described herein are not general embodiments, but embodiments in which the same or corresponding special technical features of the invention are described. An intelligent reflecting surface according to an embodiment will be described hereinafter with reference to the accompanying drawings.

In the embodiment, a first direction X, a second direction Y, and a third direction Z are orthogonal to each other, but may intersect at an angle other than 90°. A direction toward a tip of an arrow of the third direction Z is referred to as an upper or upward direction, and a direction opposite to the direction toward the tip of the arrow of the third direction Z is referred to as a lower or downward direction.

In addition, according to "a second member above a first member" and "a second member below a first member", the second member may be in contact with the first member or may be located separately from the first member. In the latter case, a third member may be interposed between the first member and the second member. In contrast, according to "a second member on a first member" and "a second member under a first member", the second member is in contact with the first member.

In addition, an observation position at which the intelligent reflecting surface is to be observed is assumed to be located on the tip side of the arrow of the third direction Z, and viewing from the observation position toward an X-Y plane defined by the first direction X and the second direction Y is referred to as plan view. Viewing a cross-section of the intelligent reflecting surface on an X-Z plane defined by the first direction X and the third direction Z or a Y-Z plane defined by the second direction Y and the third direction Z is referred to as cross-sectional view.

Embodiment

FIG. 1 is a cross-sectional view showing the intelligent reflecting surface of the embodiment. The intelligent reflecting surface RE can reflect radio waves and functions as a relay device for radio waves.

As shown in FIG. 1, the intelligent reflecting surface RE comprises a first substrate SUB1, a second substrate SUB2, and a liquid crystal layer LC. The first substrate SUB1 includes an electrically insulating base BA1, a plurality of patch electrodes PE, and an alignment film AL1. The base BA1 is formed in a flat plate shape and extends along an X-Y plane including the first direction X and the second direction Y orthogonal to each other. The alignment film AL1 covers a plurality of patch electrodes PE.

The second substrate SUB2 is opposed to the first substrate SUB1 with a predetermined gap. The second substrate SUB2 includes an electrically insulating base BA2, a common electrode CE, and an alignment film AL2. The base BA2 is formed in a flat plate shape and extends along the X-Y plane. The common electrode CE is opposed to a plurality of patch electrodes PE in a direction parallel to the third direction Z orthogonal to each of the first direction X and the second direction Y. The alignment film AL2 covers the common electrode CE. In the embodiment, each of the alignment film AL1 and the alignment film AL2 is a horizontal alignment film.

The first substrate SUB1 and the second substrate SUB2 are joined by a sealing material SAL arranged on their respective peripheral portions. The liquid crystal layer LC is provided in a space surrounded by the first substrate SUB1, the second substrate SUB2, and the sealing member SAL. The liquid crystal layer LC is held between the first substrate SUB1 and the second substrate SUB2. The liquid crystal layer LC is opposed to the plurality of patch electrodes PE on one hand and opposed to the common electrode CE on the other hand.

A thickness (cell gap) of the liquid crystal layer LC is referred to as $d_l$. The thickness $d_l$ is greater than a thickness of a liquid crystal layer of a normal liquid crystal display panel. In the embodiment, the thickness $d_l$ is 50 μm. However, the thickness $d_l$ may be less than 50 μm as long as the reflection phase of radio waves can be sufficiently adjusted. Alternatively, the thickness $d_l$ may exceed 50 μm in order to increase the reflection angle of radio waves. The liquid crystal material used for the liquid crystal layer LC of the intelligent reflecting surface RE is different from the liquid crystal material used for ordinary liquid crystal display panels. The above-described reflection phase of the radio waves will be described later.

A common voltage is applied to the common electrode CE, and the potential of the common electrode CE is fixed. In the embodiment, the common voltage is a ground voltage, for example, 0V. A voltage is also applied to the patch electrodes PE. In the embodiment, the patch electrodes PE are AC-driven. The liquid crystal layer LC is driven by so called a longitudinal electric field. A voltage applied between the patch electrodes PE and the common electrode CE acts on the liquid crystal layer LC, thereby changing the dielectric constant of the liquid crystal layer LC.

When the dielectric constant of the liquid crystal layer LC changes, the propagation speed of radio waves in the liquid crystal layer LC also changes. For this reason, the reflection phase of radio waves can be adjusted by adjusting the voltage applied to the liquid crystal layer LC. The reflection direction of radio waves can be thereby adjusted.

In the embodiment, an absolute value of the voltage applied to the liquid crystal layer LC is 10V or less. This is because the dielectric constant of the liquid crystal layer LC is saturated at 10V. However, since the voltage at which the liquid crystal layer LC is saturated varies depending on the dielectric constant of the liquid crystal layer LC, the absolute value of the voltage acting on the liquid crystal layer LC may exceed 10V. For example, when improvement of the response speed of the liquid crystal is required, a voltage of 10V or less may be applied to the liquid crystal layer LC after a voltage exceeding 10V is applied to the liquid crystal layer LC.

The first substrate SUB1 has an incident surface Sa on the side opposite to the side opposed to the second substrate SUB2. In FIG. 1, an incident wave w1 is a radio wave made incident on the intelligent reflecting surface RE, and a reflected wave w2 is a radio wave reflected on the intelligent reflecting surface RE.

Figure 2:
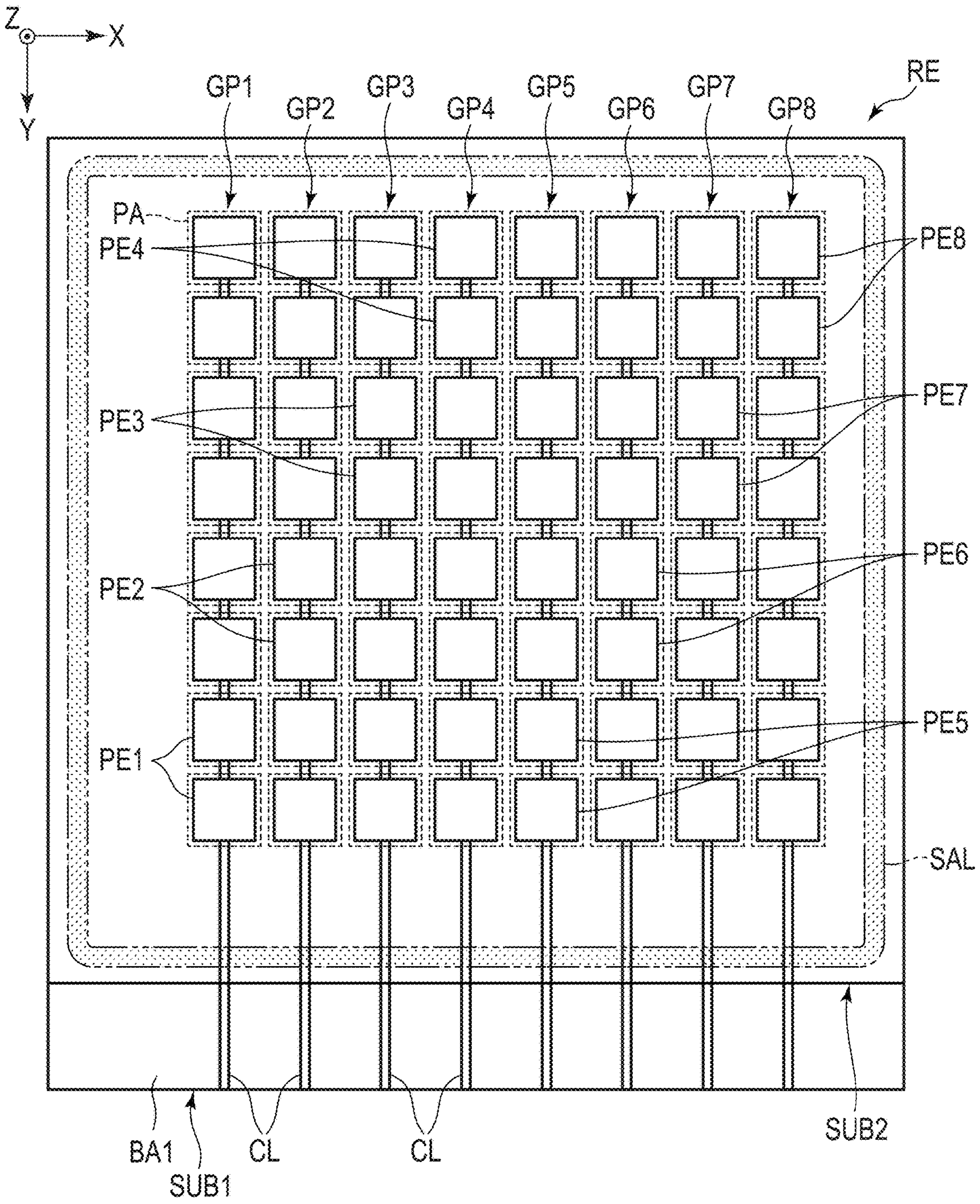
FIG. 2 is a plan view showing the intelligent reflecting surface shown in FIG. 1.

FIG. 2 is a plan view showing the intelligent reflecting surface shown in FIG. 1. The intelligent reflecting surface RE shown in FIG. 2 includes a plurality of patch areas PA arrayed in a matrix along each of the first direction X and the second direction Y. Each of the patch areas PA includes the patch electrode PE. The plurality of patch electrodes PE are arrayed in a matrix at intervals along the first direction X and the second direction Y. On the X-Y plane, the plurality of patch electrodes PE have the same shape and the same size.

The plurality of patch electrodes PE are arranged at regular intervals along the first direction X and arranged at equal intervals along the second direction Y. The plurality of patch electrodes PE are included in the plurality of patch electrode groups GP extending along the second direction Y and arranged along the first direction X. In FIG. 2, the plurality of patch electrode groups GP include, for example, a first patch electrode group GP1 to an eighth patch electrode group GP8.

The first patch electrode group GP1 includes a plurality of first patch electrodes PE1, the second patch electrode group GP2 includes a plurality of second patch electrodes PE2, the third patch electrode group GP3 includes a plurality of third patch electrodes PE3, the fourth patch electrode group GP4 includes a plurality of fourth patch electrodes PE4, the fifth patch electrode group GP5 includes a plurality of fifth patch electrodes PE5, the sixth patch electrode group GP6 includes a plurality of the six patch electrodes PE6, the seventh patch electrode group GP7 includes a plurality of seventh patch electrodes PE7, and the eighth patch electrode group GP8 includes a plurality of eighth patch electrodes PE8. For example, the second patch electrodes PE2 are located between the first patch electrodes PE1 and the third patch electrodes PE3 in the direction along the first direction X.

Each patch electrode group GP includes a plurality of patch electrodes PE arranged along the second direction Y and electrically connected to each other. In the embodiment, the plurality of patch electrodes PE of each patch electrode group GP are electrically connected by connection wires CL. Incidentally, the first substrate SUB1 includes a plurality of connection wires CL which extend along the second direction Y and which are arranged along the first direction X. The connection wires CL extend to an area of the first substrate SUB1, which is not opposed to the second substrate SUB2. Unlike the embodiment, the plurality of connection wires CL may be connected to the plurality of patch electrodes PE in one-to-one relationship.

In the embodiment, the plurality of patch electrodes PE arranged along the second direction Y and the connection wires CL are integrally formed of the same conductors. Incidentally, the plurality of patch electrodes PE and the connection wires CL may be formed of conductors different from each other. The patch electrodes PE, the connection wires CL, and the above common electrode CE are formed of metal or a conductor similar to metal. For example, the patch electrodes PE, the connection lines CL, and the common electrode CE may be formed of a transparent conductive material such as indium tin oxide (ITO). The connection wires CL may be connected to an outer lead bonding (OLB) pad (not shown). One patch area PA includes one patch electrode PE and a part of the connection wire CL which connects adjacent patch electrodes PE.

The connection wire CL is a fine wire, and a width of the connection wire CL is sufficiently smaller than a length Px which will be described later. The width of the connection wire CL is several μm to several tens of μm, and is on the order of μm. Incidentally, if the width of the connection wire L is too large, the sensitivity to the frequency component of the radio waves is changed, which is not desirable.

The sealing material SAL is arranged at a peripheral portion of the area where the first substrate SUB1 and the second substrate SUB2 are opposed to each other.

FIG. 2 shows the example in which eight patch electrodes PE are arranged in the direction along the first direction X and the direction along the second direction Y, but the embodiment is not limited to this. The number of patch electrodes PE can be variously modified. For example, hundred patch electrodes PE may be arranged along the first direction X, and a plurality of (for example, hundred) patch electrodes PE may be arranged along the second direction Y. A length of the intelligent reflecting surface RE (first substrate SUB1) in the direction along the first direction X is, for example, 40 cm or more and 80 cm or less.

Figure 3:
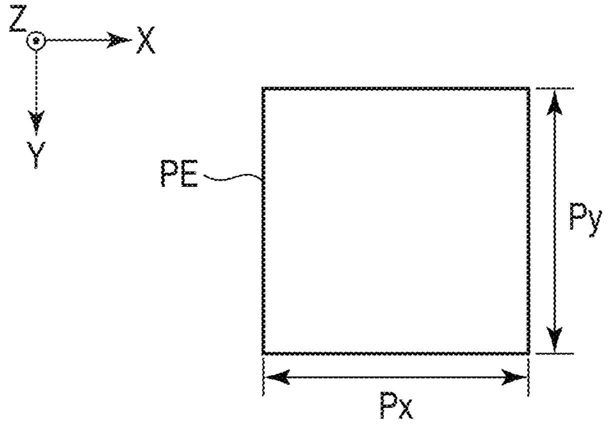
FIG. 3 is an enlarged plan view showing the patch electrode.

FIG. 3 is an enlarged plan view showing the patch electrode. As shown in FIG. 3, the patch electrode PE has a square shape. The shape of the patch electrode PE is not particularly limited, but a square or a perfect circle is desirable. When the external shape of the patch electrode PE is focused, a shape in which an aspect ratio of vertical and horizontal lengths is 1:1 is desirable. This is because a 90° rotationally symmetrical structure is desirable to respond to a horizontally polarized wave and a vertically polarized wave.

The patch electrode PE has a length Px in a direction along the first direction X and a length Py in a direction along the second direction Y. The length Px and the length Py are desirably adjusted according to the frequency range of the incident wave w1. Next, a desirable relationship between the frequency range of the incident wave w1, and the length Px and the length Py will be exemplified.

$$2.4\ \text{GHz}: Px=Py=35\ \text{mm}$$

$$5.0\ \text{GHz}: Px=Py=16.8\ \text{mm}$$

$$28\ \text{GHz}: Px=Py=3.0\ \text{mm}$$

Figure 4:
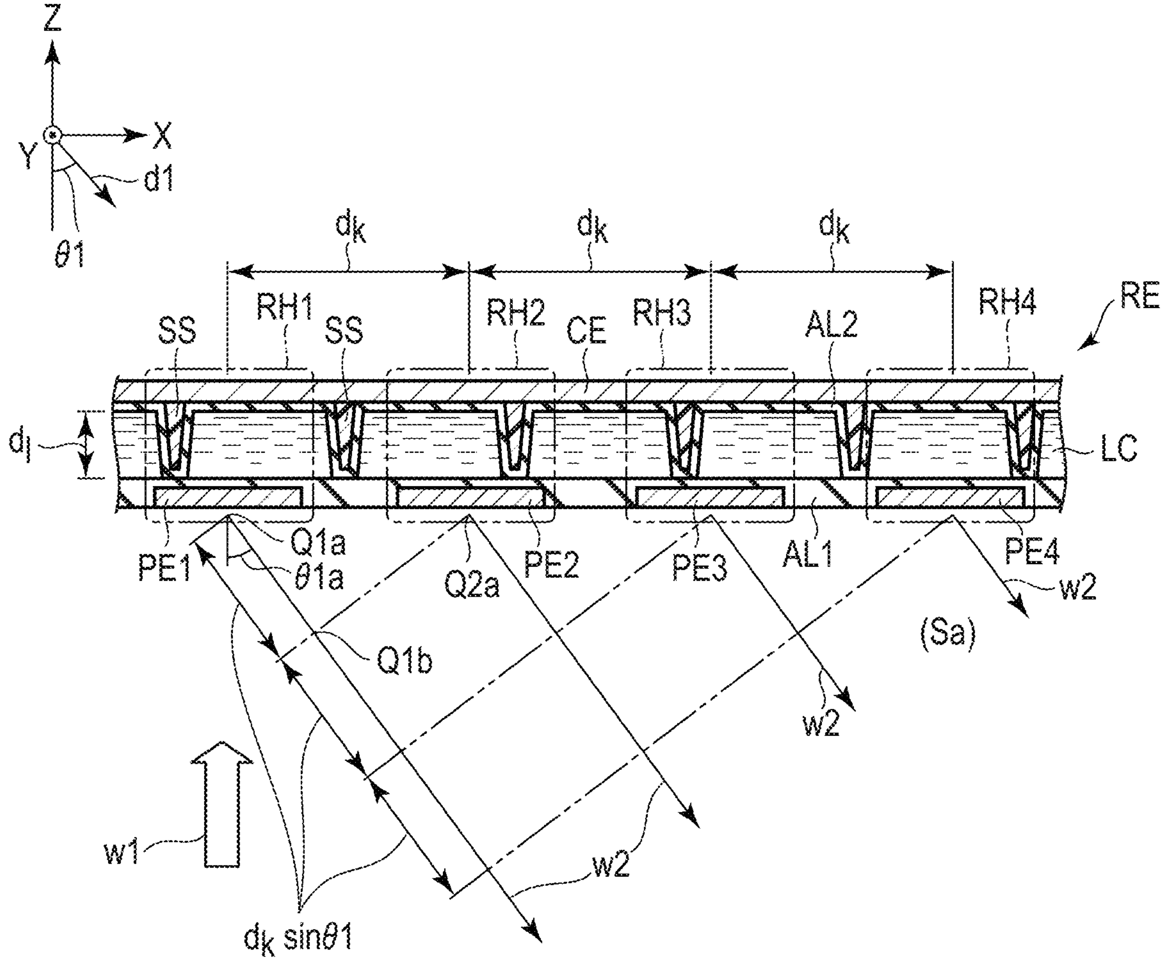
FIG. 4 is an enlarged cross-sectional view showing a part of the intelligent reflecting surface.

FIG. 4 is an enlarged cross-sectional view showing a part of the intelligent reflecting surface. As shown in FIG. 4, a thickness $d_l$ (cell gap) of the liquid crystal layer LC is held by a plurality of spacers SS. In the embodiment, the spacers SS are columnar spacers, formed in the second substrate SUB2, and protruding toward the first substrate SUB1 side.

The width of the spacer SS is 10 μm or more and 20 μm or less. While the length Px and the length Py of the patch electrode PE are on the order of mm, a cross-sectional diameter of the spacer SS in the first direction X is on the order of μm. For this reason, the spacers SS need to exist in the areas opposed to the patch electrodes PE. In addition, a ratio of the areas where the plurality of spacers SS exist, of the areas opposed to the patch electrodes PE is approximately 1%. For this reason, even if the spacers SS exist in the above areas, the influence of the spacers SS on the reflected wave w2 is small. Incidentally, the spacers SS may be formed in the first substrate SUB1 and protrude toward the second substrate SUB2 side. Alternatively, the spacers SS may be spherical spacers.

The intelligent reflecting surface RE comprises a plurality of reflection controllers RH. Each reflection controller RH includes one patch electrode PE among the plurality of patch electrodes PE, a portion of the common electrode CE, which is opposed to the one patch electrode PE, and an area of the liquid crystal layer LC, which is opposed to the one patch electrode PE. Each reflection controller RH functions to adjust the phase of the radio wave (incident wave w1) made incident from the incident surface Sa side according to the voltage applied to the patch electrode PE, and urge the radio wave to be reflected on the incident surface Sa side as the reflected wave w2. In each reflection controller RH, the reflected wave w2 is a synthetic wave of the radio wave reflected on the patch electrode PE and the radio wave reflected on the common electrode CE.

The patch electrodes PE are arranged at regular intervals in the direction along the first direction X. A length (pitch) between adjacent patch electrodes PE is referred to as $d_k$. The length $d_k$ corresponds to a distance from a geometric center of one patch electrode PE to a geometric center of the adjacent patch electrode PE. In the embodiment, it is assumed that the reflected waves w2 have the same phase in the first reflection direction d1. On the X-Z plane of FIG. 4, the first reflection direction d1 is a direction forming a first angle θ1 with the third direction Z. The first reflection direction d1 is parallel to the X-Z plane. In FIG. 4, θ1*a* is equal to θ1 (θ1=θ1*a*).

In order for the phases of the radio waves reflected on the plurality of reflection controllers RH to be aligned in the first reflection direction d1, the phases of the radio waves need only be aligned on the linear two-dot chain line. For example, the phase of the reflected wave w2 at point Q1*b* and the phase of the reflected wave w2 at point Q2*a* may be aligned. A physical linear distance from point Q1*a* to point Q1*b* of the first patch electrode PE1 is $d_k \times \sin\theta 1$. Therefore, when the first reflection controller RH1 and the second reflection controller RH2 are focused, the phase of the reflected wave w2 from the second reflection controller RH2 may be delayed from the phase of the reflected wave w2 from the first reflection control section RH1 by a phase amount δ1. The phase amount δ1 is represented by the following equation.

$$\delta 1 = d_k \times \sin\theta 1 \times 2\pi/\lambda$$

Figure 5:
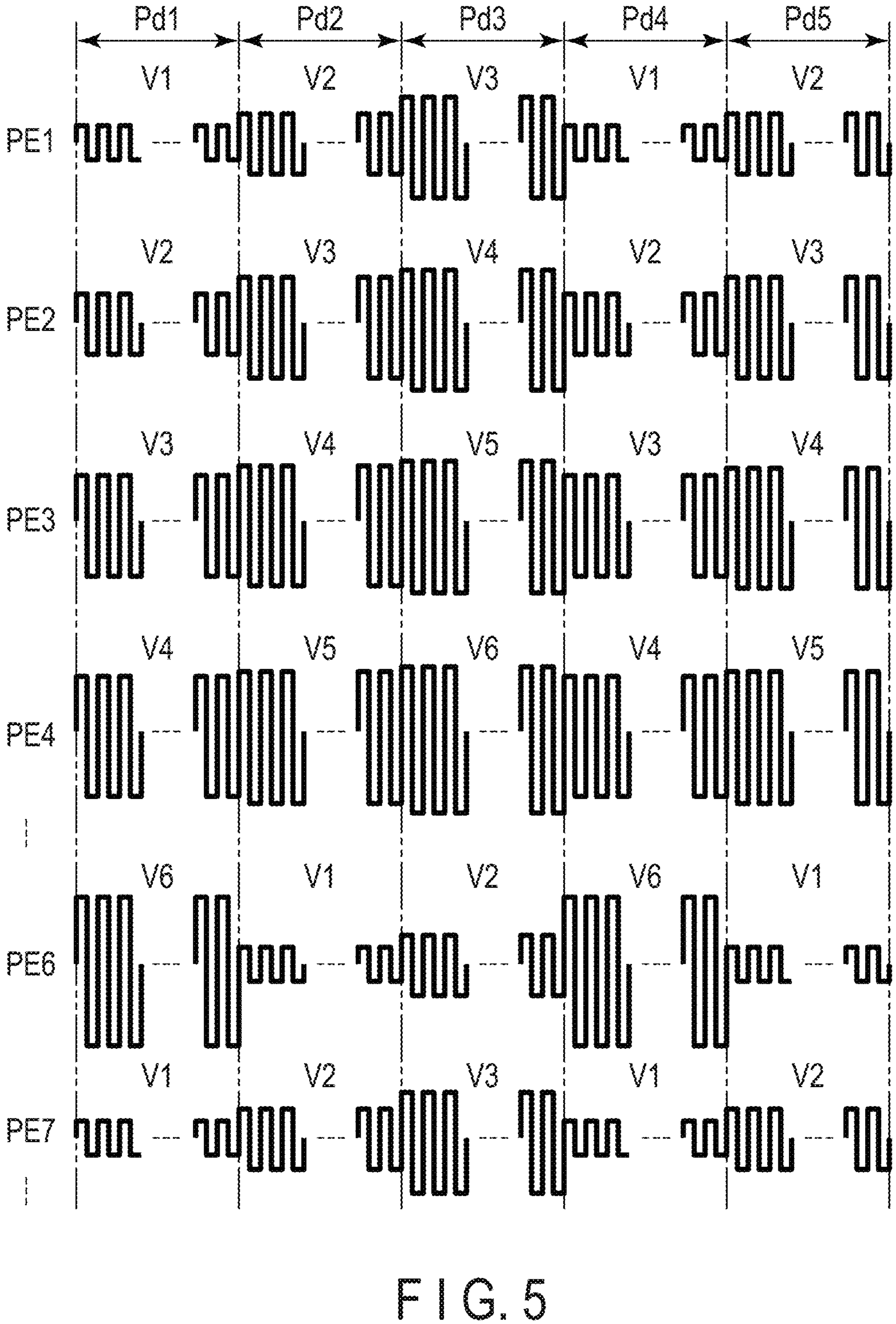
FIG. 5 is a timing chart showing changes in the voltage applied to the patch electrode for each period in a method of driving the intelligent reflecting surface of the embodiment.

FIG. 5 is a timing chart showing changes in the voltage applied to the patch electrode for each period in a method of driving the intelligent reflecting surface of the embodiment. FIG. 5 shows a first period Pd1 to a fifth period Pd5 of the driving periods of the intelligent reflecting surface RE.

As shown in FIG. 4 and FIG. 5, when driving the intelligent reflecting surface RE is started, voltages V are applied to the plurality of patch electrodes PE such that the radio waves reflected on the plurality of reflection controllers RH have the same phase in the first reflection direction d1 for the first period Pd1. For example, a first voltage V1 is applied to the first patch electrode PE1, a second voltage V2 is applied to the second patch electrode PE2, and a third voltage V3 is applied to the third patch electrode PE3.

In a second period Pd2 following the first period Pd1, voltages are applied to the plurality of patch electrodes PE such that the radio waves reflected by the plurality of reflection controllers RH are held in the same phase in the first reflection direction d1. For example, the second voltage V2 is applied to the first patch electrode PE1, the third voltage V3 is applied to the second patch electrode, and the fourth voltage V4 is applied to the third patch electrode PE3.

In each period Pd, the same voltage is applied to the plurality of patch electrodes PE of each patch electrode group GP via the connection lines CL.

When the potential of the common electrode CE is referred to as a reference, in each of the first period Pd1 and the second period Pd2, the polarity of the voltage applied to each patch electrode PE is periodically reversed. For example, the patch electrode PE is driven with a drive frequency of 60 Hz. Since the patch electrode PE is AC-driven, a fixed voltage is not applied to the liquid crystal layer LC for a long period. Since the occurrence of burning can be suppressed, deviation of the direction of the reflected wave w2 from the first reflection direction d1 can be suppressed.

Furthermore, in the embodiment, in each patch electrode PE, an absolute value of the voltage applied for the second period Pd2 is different from an absolute value of the voltage applied for the first period Pd1. Since the occurrence of burning can be sufficiently suppressed, the deviation of the direction of the reflected wave w2 from the first reflection direction d1 can be suppressed.

Even if the period Pd changes to another period Pd, the phase amount δ1 of the radio waves reflected in the first reflection direction d1 by one reflection controller RH and the radio waves reflected in the first reflection direction d1 by the adjacent reflection controller RH is maintained. In the embodiment, the phase amount δ1 is 60°.

In the example shown in FIG. 5, the sixth voltage V6 is applied to the sixth patch electrode PE6 for the first period Pd1. A phase difference of 300° is assigned between the radio waves reflected in the first reflection direction d1 by the first reflection controller RH1 and the radio waves reflected in the first reflection direction d1 by the sixth reflection controller including the sixth patch electrode PE6.

A seventh voltage may be applied to the seventh patch electrode PE7 for the first period Pd1 to assign a phase difference of 360° between the radio waves reflected in the first reflection direction d1 by the first reflection controller RH1 and the radio waves reflected in the first reflection direction d1 by the seventh reflection controller including the seventh patch electrode PE7. In the embodiment, however, the first voltage V1 is applied to the seventh patch electrode PE7 for the first period Pd1. A large number of patch electrodes PE can be driven while suppressing the types of voltages V, by a periodic voltage application pattern.

Figure 6:
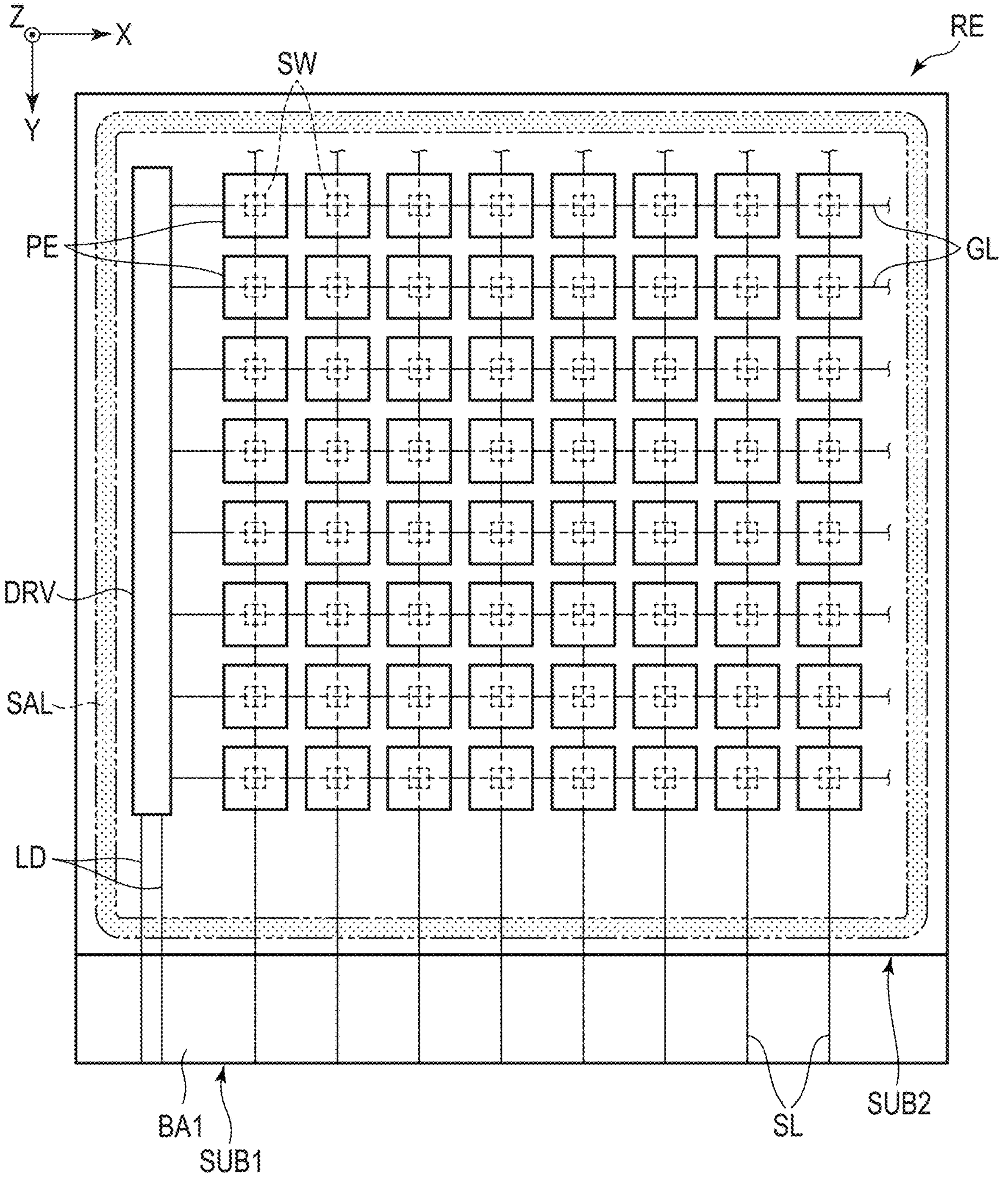
FIG. 6 is a plan view showing the intelligent reflecting surface of the embodiment.

FIG. 6 is a plan view showing the intelligent reflecting surface of the embodiment. The example shown in FIG. 6 is different from the example shown in FIG. 1 in that a switching element for controlling the patch electrode PE is provided.

As shown in FIG. 6, the first substrate SUB1 includes a plurality of signal lines SL, a plurality of scanning lines GL, a plurality of switching elements SW, a drive circuit DRV, and a plurality of lead lines LD instead of the connection lines CL.

The plurality of signal lines SL extend along the second direction Y and are arranged along the first direction X. The plurality of scanning lines GL extend along the first direction X and are arranged along the second direction Y. The plurality of scanning lines GL are connected to the drive circuit DRV. The switching element SW is provided near an intersection of one signal line SL and one scanning line GL. A plurality of lead lines LD are connected to the drive circuit DRV. Each of the signal lines SL and the lead lines LD may be connected to an outer lead bonding (OLB) pad.

Figure 7:
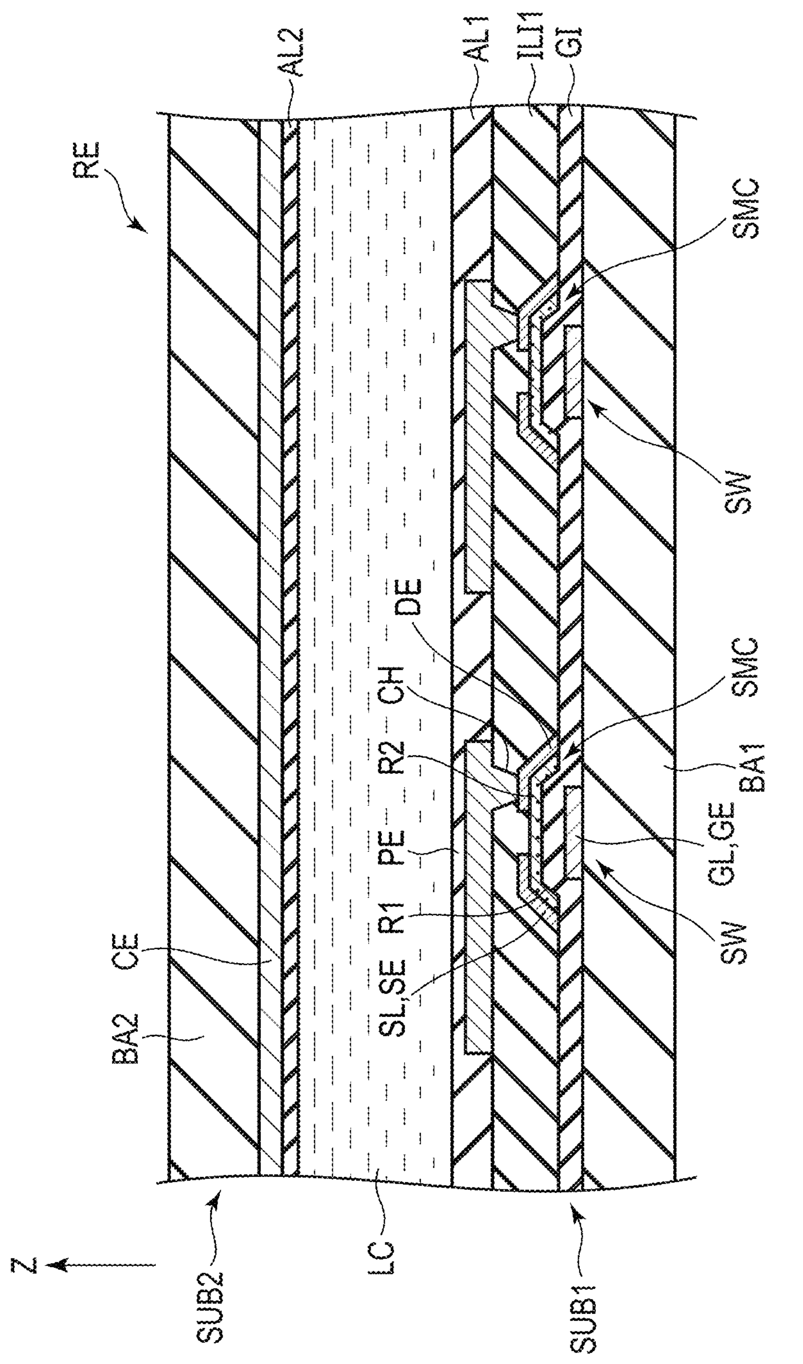
FIG. 7 is a partially enlarged cross-sectional view showing the intelligent reflecting surface.

FIG. 7 is a partially enlarged cross-sectional view showing the intelligent reflecting surface. As shown in FIG. 7, the scanning line GL is provided on the base BA1 of the intelligent reflecting surface RE. The scanning line GL includes a gate electrode GE. An insulating layer GI is formed on the base BA1 and the scanning line GL. A semiconductor layer SMC is provided on the insulating layer GI. The semiconductor layer SMC overlaps with the gate electrode GE and includes a first area R1 and a second area R2. One of the first region R1 and the second region R2 is a source area and the other is a drain area.

The gate electrode GE, the semiconductor layer SMC, and the like constitute a switching element SW as a thin-film transistor (TFT). The switching element SW may be a bottom-gate thin film transistor or a top-gate thin film transistor.

A source electrode SE is provided to be in contact with the first area R1 of the semiconductor layer SMC, and a drain electrode DE is provided to be in contact with the second area R2 of the semiconductor layer SMC. The source electrode SE may be formed integrally with the signal line SL.

An insulating layer ILI1 is formed on the insulating layer GI, the semiconductor layer SMC, the source electrode SE, and the drain electrode DE.

The patch electrode PE is formed on the insulating layer ILI1. The patch electrode PE is connected to the drain electrode DE through a contact hole CH formed in the insulating layer ILI1. The alignment film AL1 is formed on the insulating layer ILI2 and the patch electrode PE.

Figure 8:
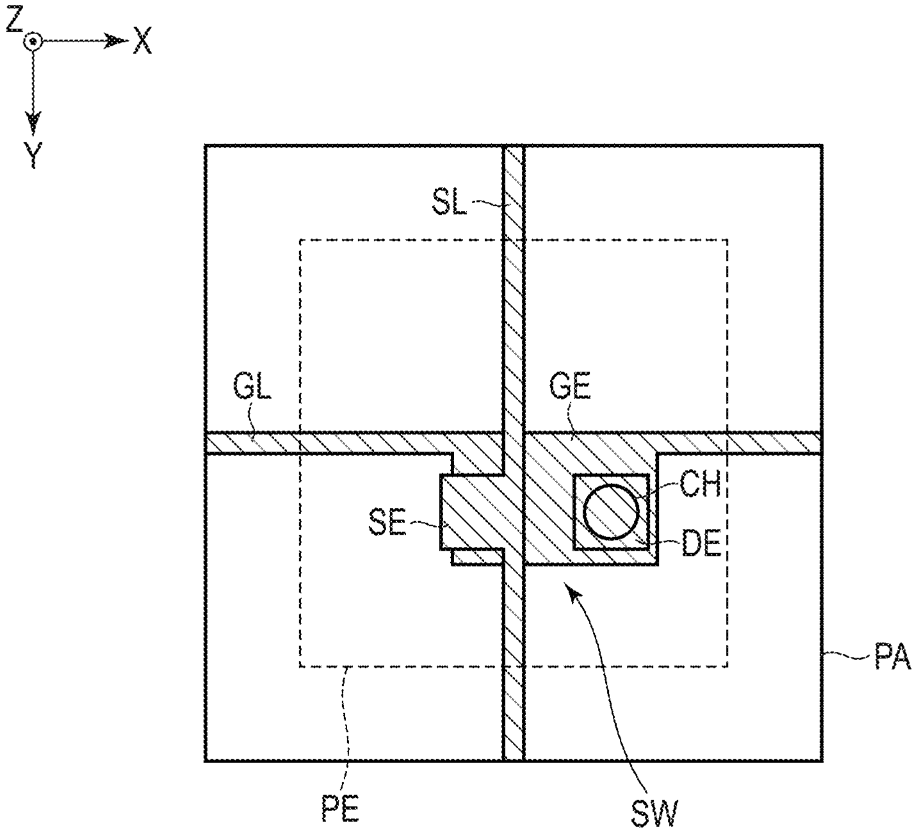
FIG. 8 is a plan view showing the switching element.

FIG. 8 is a plan view showing the switching element. In FIG. 8, description of the semiconductor layer SMC is omitted.

The scanning line GL extending along the first direction X and the signal line SL extending along the second direction Y have intersecting areas having large widths, respectively. The area having the large width, of the scanning line GL, is the gate electrode GE, and the area having the large width, of the signal line SL, is the source electrode SE.

As shown in FIG. 6 to FIG. 8, the plurality of patch electrodes PE can be individually driven by active matrix driving. For this reason, the plurality of patch electrodes PE can be driven independently. For example, the direction of the reflected wave w2 reflected by the intelligent reflecting surface RE can be made parallel to the Y-Z plane.

Figure 9:
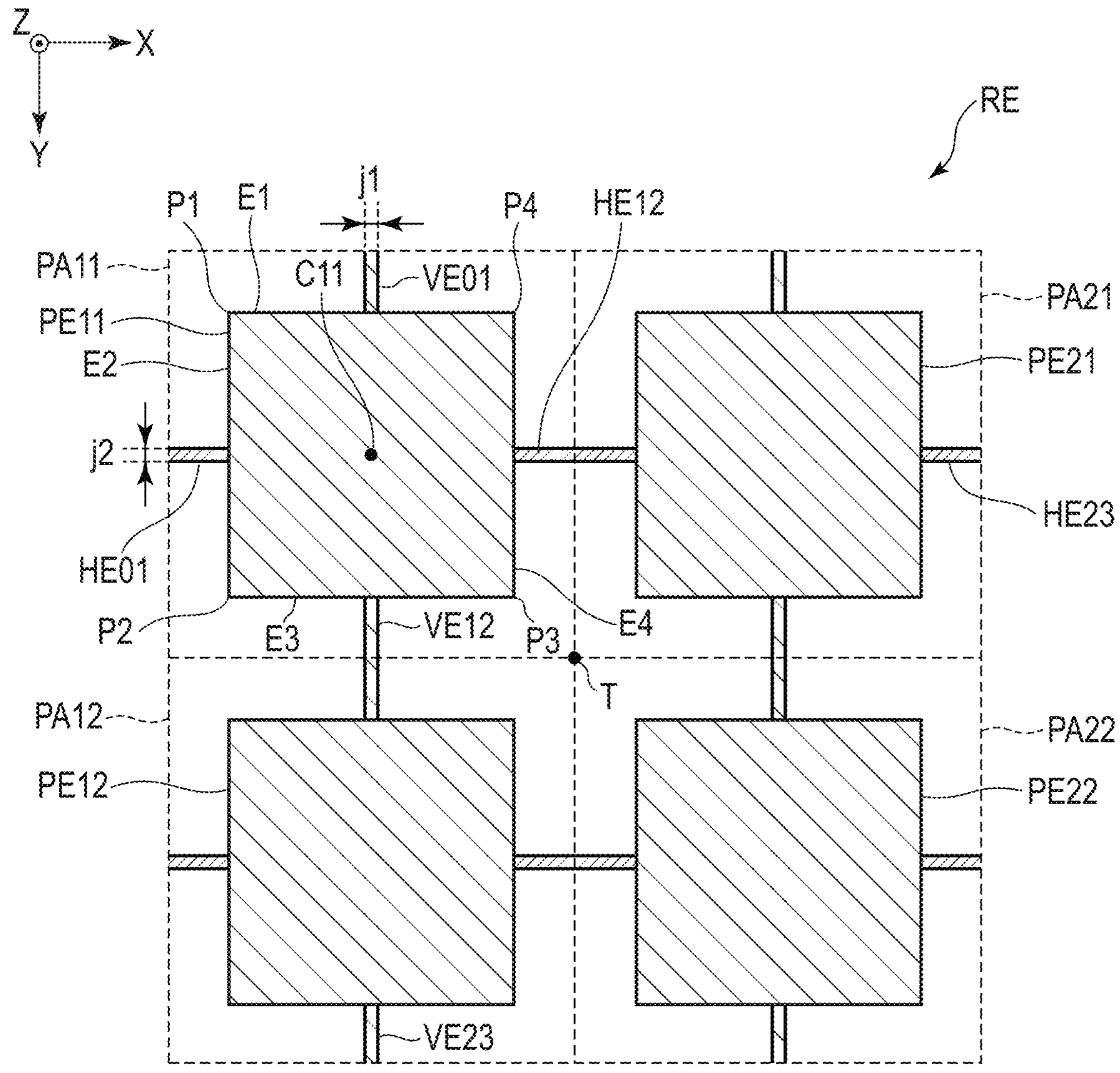
FIG. 9 is a plan view showing the intelligent reflecting surface of the embodiment.

FIG. 9 is a plan view showing the intelligent reflecting surface of the embodiment. The intelligent reflecting surface RE has arbitrary four patch areas PA11, PA12, PA21, and PA22. The patch area PA11, the patch area PA12, the patch area PA21, and the patch area PA22 include a patch electrode PE11, a patch electrode PE12, a patch electrode PE21, and a patch electrode PE22, respectively.

The patch area PA11 and the patch area PA12 are adjacent to each other in the second direction Y. The patch area PA11 and the patch area PA21 are adjacent to each other in the first direction X. The patch area PA12 and the patch area PA22 are adjacent to each other in the first direction X, and the patch area PA21 and the patch area PA22 are adjacent to each other in the second direction Y.

In each of the patch electrodes PE, sides extending along the first direction X are referred to as side E1 and side E3, and sides extending along the second direction Y are referred to as side E2 and side E4. The side E1, the side E2, the side E3, and the side E4 have the same length.

An intersection of the side E1 and the E2 is referred to as point P1, an intersection of the side E2 and the side E3 is referred to as point P2, an intersection of the side E3 and the side E4 is referred to as point P3, and an intersection of the side E4 and the side E1 is referred to as point P4. The point P1, the point P2, the point P3, and the point P4 are also considered to be corners or vertices of the square patch electrode PE.

In the embodiment, an electrode which connects the patch electrodes PE adjacent to each other along the first direction X is referred to as a connection electrode HE. An electrode which connects the patch electrodes PE adjacent to each other along the second direction Y is referred to as a connection electrode VE.

The patch area PA11 includes the patch electrode PE11. The patch electrode PE11 is connected to a connection electrode HE01 and a connection electrode HE12 which extend in a direction parallel to the first direction X. The patch electrode PE11 is connected to a connection electrode VE11 and a connection electrode VE12 which extend in a direction parallel to the second direction Y.

The patch electrodes PE in the other patch areas PA are also connected to adjacent patch electrodes, similarly to the patch electrode PE11.

In FIG. 9, a length (width) j1 of the connection electrode VE along the first direction X is equal to a length (width) j2 of the connection electrode HE along the second direction Y. In other words, j1=j2 is satisfied.

The connection electrode VE01 extends in a direction opposite to the second direction Y from the side E1. The connection electrode VE01 is arranged at a position equidistant from the point P1 and the point P4.

The connection electrode VE12 extends along the second direction Y from the side E3. The connection electrode VE12 is arranged at a position equidistant from the point P2 and the point P3.

In other words, the position where the connection electrode VE01 is arranged is a center of the side E1. The position where the connection electrode VE12 is arranged is a center of the side E3. The connection electrode VE01 and the connection electrode VE12 are arranged in a straight line along a direction parallel to the second direction Y, and arranged line-symmetrically with respect to a center point C11 of the patch electrode PE11.

The connection electrode HE01 extends in a direction opposite to the first direction X from the side E2. The connection electrode HE01 is arranged at a position equidistant from the point P1 and the point P2.

The connection electrode HE12 extends along the first direction X from the side E4. The connection electrode HE12 is arranged at a position equidistant from the point P3 and the point P4.

In other words, the position where the connection electrode HE01 is arranged is a center of the side E2. The position where the connection electrode HE12 is arranged is a center of the side E4. The connection electrode HE01 and the connection electrode HE12 are arranged in a straight line along a direction parallel to the first direction X, and arranged line-symmetrically with respect to the center point C11 of the patch electrode PE11.

In the embodiment, the electrode shape formed by the patch electrode PE, the connection electrode VE, and the connection electrode HE included in one patch area PA has rotational symmetry having the center point C11 of the patch area PA as a center of rotation.

With respect to four patch areas PA11, PA12, PA21, and PA22, the four patch areas PA as a whole are considered to have rotational symmetry. In this case, the center of rotation is an intersection T of the four patch areas PA.

In one patch area, the electrode shape viewed from the incident surface Sa is desirably a shape which acts substantially equally in the horizontal polarization direction and the vertical polarization direction. This is because if the electrode shape acts differently in each direction, the reflection characteristics of the horizontally polarized wave and the vertically polarized wave become different.

In the intelligent reflecting surface RE of the embodiment, since the electrode shape formed by the patch electrode PE, the connection electrode VE, and the connection electrode HE has rotational symmetry, the electrode shape acts substantially equally in the horizontal polarization direction and the vertical polarization direction. The reflection characteristics of the intelligent reflecting surface RE can be thereby improved.

Similarly to FIG. 2, when the intelligent reflecting surface RE is controlled for each patch electrode group GP, the connection electrodes VE may be integrally formed of the same conductors as the patch electrodes PE or may be formed of conductors different from each other. The connection electrode HE may not be connected to the patch electrode PE and may be a dummy electrode. In other words, the connection electrode HE may be in a floating state.

As shown in FIG. 6, when the intelligent reflecting surface RE is driven in an active matrix, the connection electrode HE may be the scanning line GL, and the connection electrode VE may be the signal line SL.

Incidentally, not the connection electrode HE, but the connection electrode VE may be used as a dummy electrode. In that case, a voltage may be applied to the patch electrode PE via the connection electrode HE. In other words, one of the connection electrode HE and the connection electrode VE may be used as an electrode to which a voltage is applied, and the other may be used as a dummy electrode.

Figure 10:
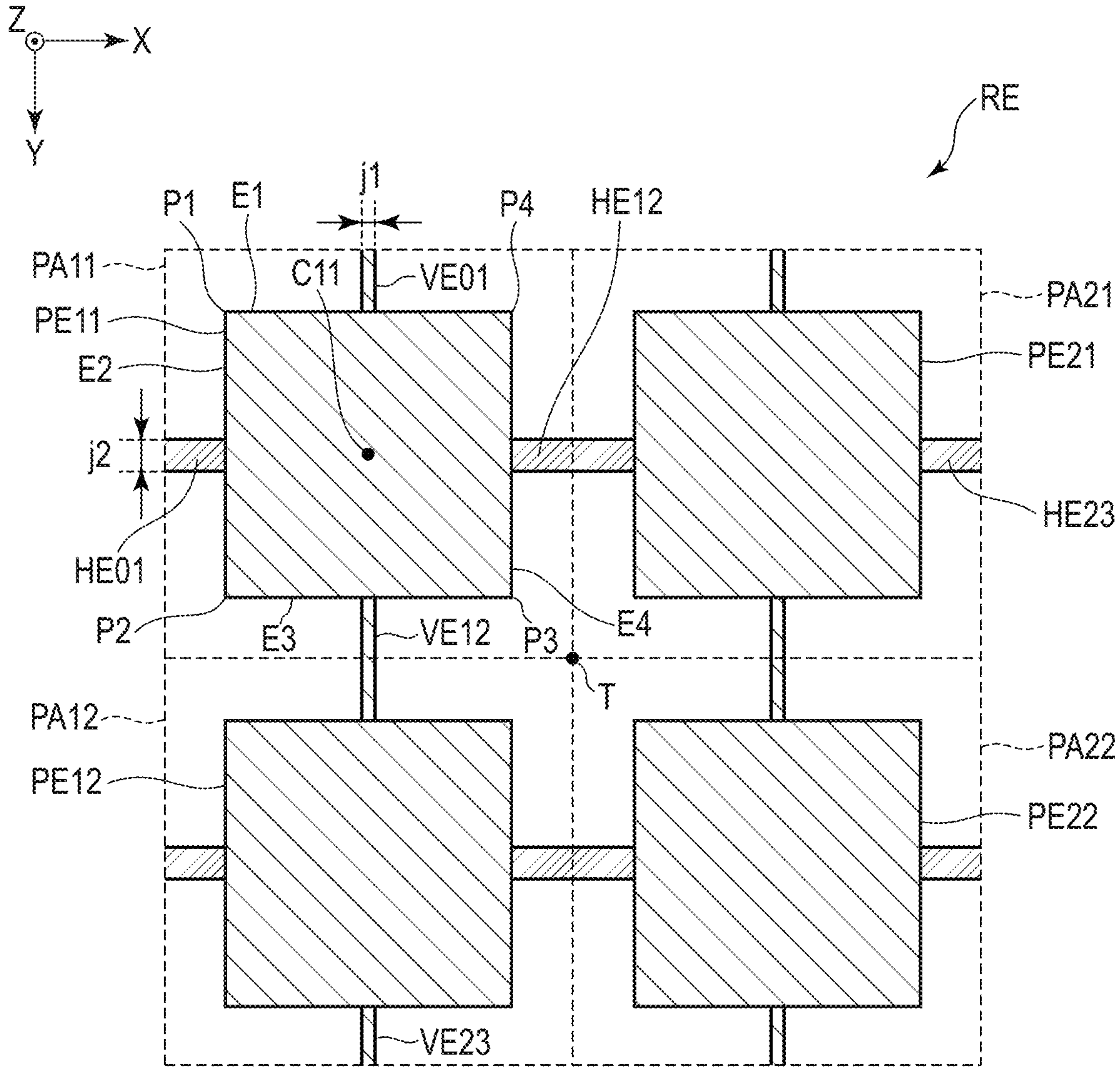
FIG. 10 is a plan view showing another configuration example of the intelligent reflecting surface of the embodiment.

FIG. 10 is a plan view showing another configuration example of the intelligent reflecting surface of the embodiment. The configuration example shown in FIG. 10 is different from the configuration example shown in FIG. 9 in that the widths of the connection electrodes VE and HE are different from each other.

In the intelligent reflecting surface RE shown in FIG. 10, the width j2 of the connection electrode HE is larger than the width j1 of the connection electrode VE. In other words, j2>j1.

Even in such a case, the electrode shape included in one patch area PA has rotational symmetry.

The four patch areas PAH, PA12, PA21, and PA22 shown in FIG. 10 also have rotational symmetry as a whole.

In the intelligent reflecting surface RE shown in FIG. 10 as well, since the electrode shape formed by the patch electrode PE, the connection electrode VE, and the connection electrode HE have rotational symmetry. the electrode shape acts substantially equally in the horizontal polarization direction and the vertical polarization direction. The reflection characteristics of the intelligent reflecting surface RE can be thereby improved.

In the present disclosure, the connection electrode VE extending along a direction opposite to the second direction Y is referred to as a first connection electrode, the connection electrode HE extending along a direction opposite to the first direction X is referred to as a second connection electrode, the connection electrode VE extending along the second direction Y is referred to as a third connection electrode, and the connection electrode HE extending along the first direction X is referred to as a fourth connection electrode.

The first connection electrode and the third connection electrode extend in a direction parallel to the second direction Y. The second connection electrode and the fourth connection electrode extend in a direction parallel to the first direction X.

In the present disclosure, for example, the patch area PA11 is referred to as a first patch area, the patch area PA12 adjacent to the patch area PA11 in the second direction Y is referred to as a second patch area, the patch area PA21 adjacent to the patch area PA11 in the first direction X is referred to as a third patch area, and the patch area PA22 adjacent to the patch area PA12 in the first direction X and adjacent to the patch area PA21 in the second direction Y is referred to as a fourth patch area.

In the present disclosure, in the patch electrode PE, the sides E1 and E3 extending along the first direction X are referred to as a first side and a third side, respectively, and the sides E2 and E4 extending along the second direction Y are referred to as a second side and a fourth side, respectively.

The point P1 which is the intersection of the side E1 and the E2, the point P2 which is the intersection of the side E2 and the side E3, the point P3 which is the intersection of the side E3 and the side E4, and the point P4 which is the intersection of the side E4 and the side E1, are referred to as a first point, a second point, a third point, and a fourth point, respectively.

Configuration Example 1

Figure 11:
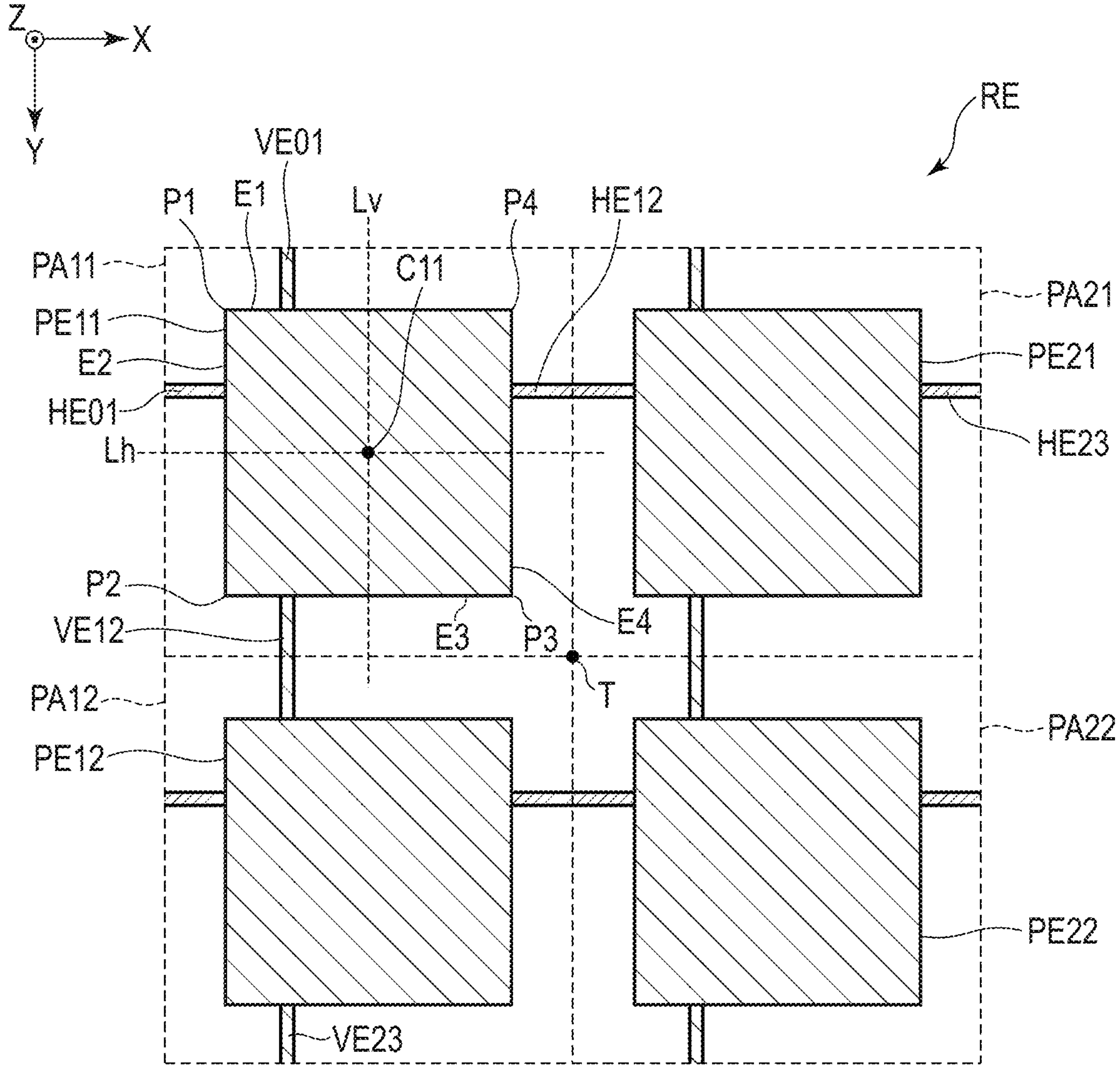
FIG. 11 is a plan view showing yet another configuration example of the intelligent reflecting surface of the embodiment.

FIG. 11 is a plan view showing yet another configuration example of the intelligent reflecting surface of the embodiment. The configuration example shown in FIG. 11 is different from the configuration example shown in FIG. 9 in that the connection electrodes VE and the connection electrodes HE are arranged at positions displaced from the centers of the sides.

An imaginary line Lh passing through the center point C11 and extending along the first direction X is a virtual line passing through the centers of the sides E2 and E4. An imaginary line Lv passing through the center point C11 and extending along the second direction Y is a virtual line passing through the centers of the sides E1 and E3.

The connection electrode VE01 extends from the side E1. Unlike FIG. 9, however, the connection electrode VE01 is not arranged in the center of the side E1. The connection electrode VE01 is not arranged at a position equidistant from the point P1 and the point P4, but is arranged at a position closer to the point P1 than to the point P4.

The connection electrode VE12 extends from the side E3. Unlike FIG. 9, however, the connection electrode VE12 is not arranged in the center of the side E3. The connection electrode VE12 is not arranged at a position equidistant from the point P2 and the point P3, but is arranged at a position closer to the point P2 than to the point P3.

The connection electrode HE01 extends from the side E2. Unlike FIG. 9, however, the connection electrode HE01 is not arranged in the center of the side E2. The connection electrode HE01 is not arranged at a position equidistant from the point P1 and the point P2, but is arranged at a position closer to the point P1 than to the point P2.

The connection electrode HE12 extends from the side E4. Unlike FIG. 9, however, the connection electrode HE12 is not arranged in the center of the side E4. The connection electrode HE12 is not arranged at a position equidistant from the point P3 and the point P4, but is arranged at a position closer to the point P4 than to the point P3.

The connection electrode VE01 and the connection electrode VE12 are straight electrodes or wires extending in a direction parallel to the second direction Y. The connection electrode VE01 and the connection electrode VE12 do not overlap with the imaginary line Lv, but are arranged at displaced positions.

The connection electrode HE01 and the connection electrode HE12 are straight electrodes or wires extending in a direction parallel to the first direction X. The connection electrode HE01 and the connection electrode HE12 do not overlap with the imaginary line Lh, but are arranged at displaced positions.

Similarly to FIG. 2, when the intelligent reflecting surface RE is controlled for each patch electrode group GP, the connection electrodes VE may be integrally formed of the same conductors as the patch electrodes PE or may be formed of conductors different from each other. The connection electrode HE may not be connected to the patch electrode PE and may be a dummy electrode. In other words, the connection electrode HE may be in a floating state.

As shown in FIG. 6, when the intelligent reflecting surface RE is driven in an active matrix, the connection electrode HE may be the scanning line GL, and the connection electrode VE may be the signal line SL.

Incidentally, not the connection electrode HE, but the connection electrode VE may be used as a dummy electrode. In that case, a voltage may be applied to the patch electrode PE via the connection electrode HE. In other words, one of the connection electrode HE and the connection electrode VE may be used as an electrode to which a voltage is applied, and the other may be used as a dummy electrode.

In the configuration example, the electrode shape formed by the patch electrode PE, the connection electrode VE, and the connection electrode HE included in one patch area PA does not have rotational symmetry. Four patch areas PA11, PA12, PA21, and PA22 as a whole do not have rotational symmetry, either. However, both the above-described electrode shape included in one patch area PA and the whole four patch areas PA have symmetry in the horizontal polarization direction and the vertical polarization direction.

Figure 12:
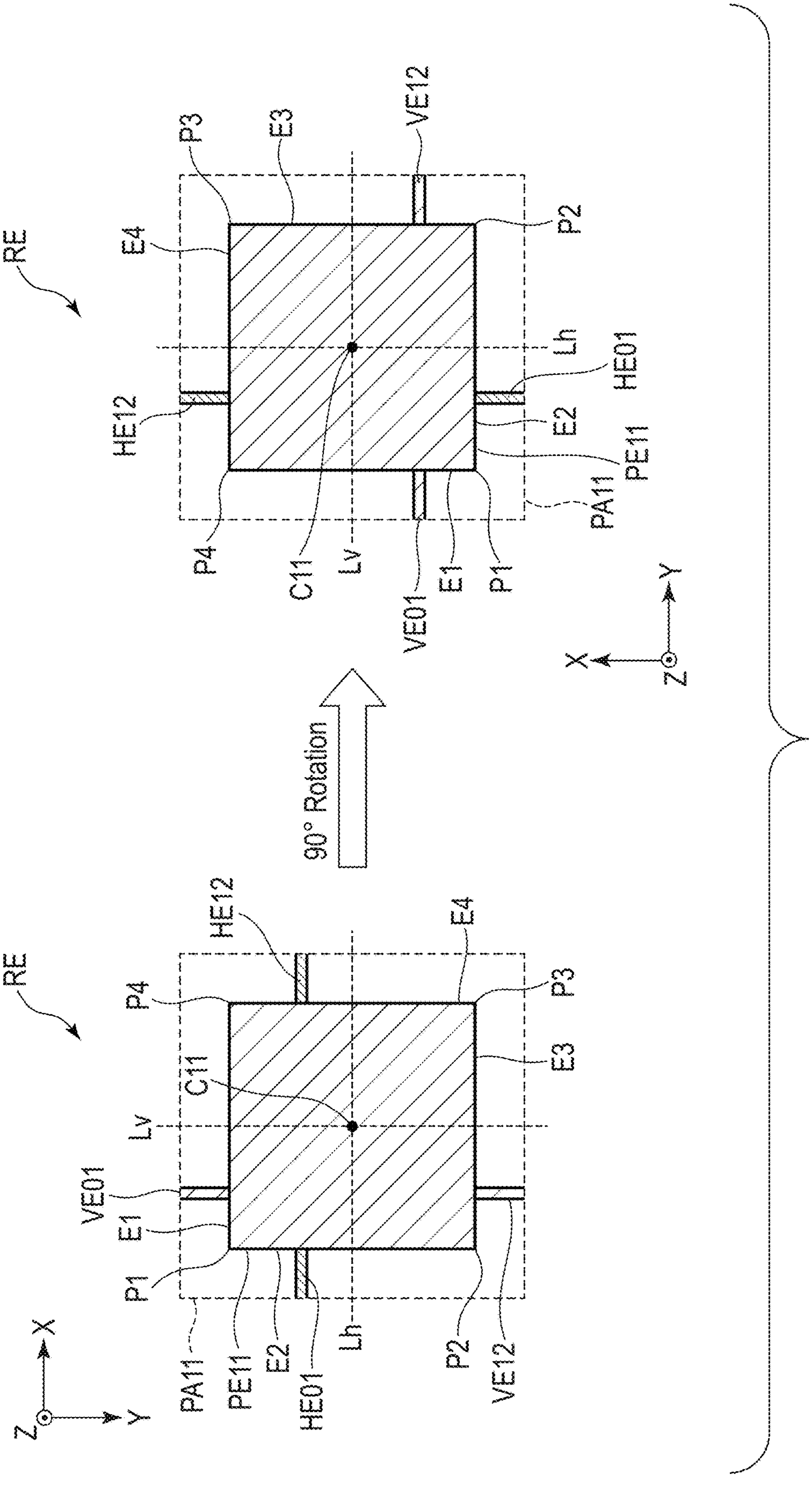
FIG. 12 is a view showing a state in which a patch area PAH is rotated counterclockwise at 90°.

FIG. 12 is a view showing a state in which a patch area PA11 is rotated counterclockwise at 90°. The electrode shapes including the patch electrode PE, the connection electrode VE, and the connection electrode HE are not the same before and after the rotation. After the rotation, however, the electrode shape also has symmetry in the horizontal polarization direction and the vertical polarization direction. Therefore, similarly, the electrode shape acts on the incident wave w1 substantially equally in the horizontal polarization direction and the vertical polarization direction. In the configuration example shown in FIG. 12 as well, the reflection characteristics of the intelligent reflecting surface RE can be improved.

Figure 13:
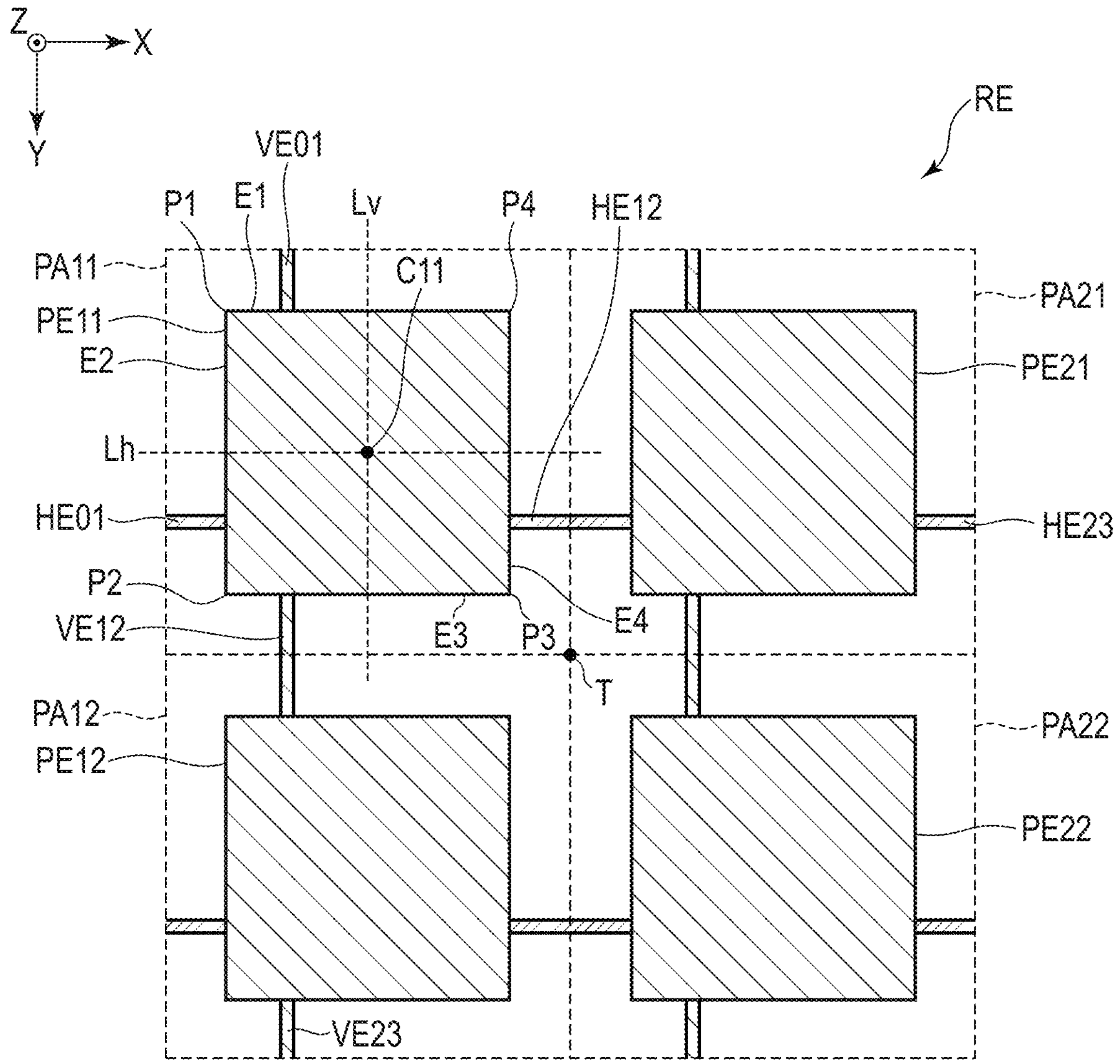
FIG. 13 is a plan view showing yet another configuration example of the intelligent reflecting surface of the embodiment.

FIG. 13 is a plan view showing yet another configuration example of the intelligent reflecting surface of the embodiment. The configuration example shown in FIG. 13 is different from the configuration example illustrated in FIG. 11 in the position of the connection electrode HE.

In the intelligent reflecting surface RE shown in FIG. 13, the connection electrode HE01 is not arranged in the center of the side E2. The connection electrode HE01 is not arranged at a position equidistant from the point P1 and the point P2, but is arranged at a position closer to the point P2 than to the point P1.

The connection electrode HE12 is not arranged in a center of the side E4. The connection electrode HE12 is not arranged at a position equidistant from the point P3 and the point P4, but is arranged at a position closer to the point P3 than to the point P4.

In FIG. 13 as well, similarly to FIG. 11, the connection electrode VE01 and the connection electrode VE12 are straight electrodes or wires extending in a direction parallel to the second direction Y. The connection electrode VE01 and the connection electrode VE12 do not overlap with the imaginary line Lv, but are arranged at displaced positions.

The connection electrode HE01 and the connection electrode HE12 are straight electrodes or wires extending in a direction parallel to the first direction X. The connection electrode HE01 and the connection electrode HE12 do not overlap with the imaginary line Lh, but are arranged at displaced positions.

In the configuration example shown in FIG. 13, both the above-described electrode shape included in one patch area PA and the whole four patch areas PA have symmetry in the horizontal polarization direction and the vertical polarization direction. The reflection characteristics of the intelligent reflecting surface RE can be therefore improved.

In the configuration example as well, the same advantages as those in the embodiment can be achieved.

In the present disclosure, the imaginary line Lv extending along the second direction Y through a center point C (for example, center point C11) of the patch electrode PE is referred to as a first imaginary line. An imaginary line Lh passing through the center point C and extending along the first direction X is referred to as a second imaginary line.

Configuration Example 2

Figure 14:
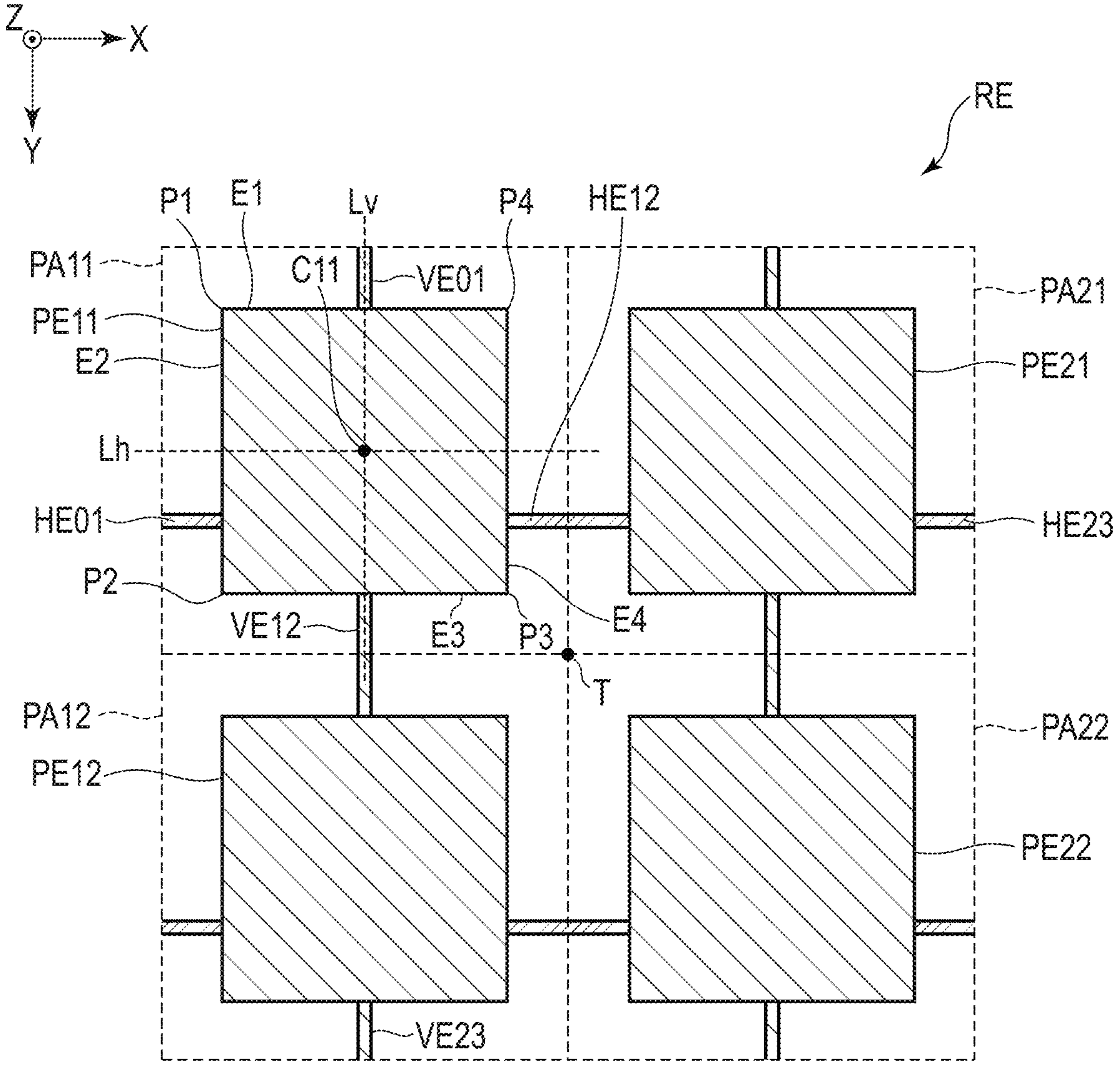
FIG. 14 is a plan view showing yet another configuration example of the intelligent reflecting surface of the embodiment.

FIG. 14 is a plan view showing yet another configuration example of the intelligent reflecting surface of the embodiment. The configuration example shown in FIG. 14 is different from the configuration example shown in FIG. 9 in that one of the connection electrode VE and the connection electrode HE is arranged at a position displaced from the center of the side.

In the intelligent reflecting surface RE shown in FIG. 14, the position of the connection electrode VE is the same as that in FIG. 9. In other words, the connection electrode VE01 and the connection electrode VE12 are straight electrodes or wires extending in a direction parallel to the second direction Y, and overlap with the imaginary line Lv.

The connection electrode HE01 is arranged in a center of the side E2. The connection electrode HE01 is arranged at a position which does not overlap with but is displaced from the imaginary line Lh. The connection electrode HE01 is not arranged at a position equidistant from the point P1 and the point P2, but is arranged at a position closer to the point P2 than to the point P1.

The connection electrode HE12 is not arranged in a center of the side E4. The connection electrode HE12 is arranged at a position which does not overlap with but is displaced from the imaginary line Lh. The connection electrode HE12 is not arranged at a position equidistant from the point P3 and the point P4, but is arranged at a position closer to the point P3 than to the point P4.

In other words, the connection electrode HE01 and the connection electrode HE12 are straight electrodes or wires extending in a direction parallel to the first direction X, and are arranged at positions displaced from the imaginary line Lh.

However, the positions of the connection electrode HE01 and the connection electrode HE12 are not limited to the above as long as they are not arranged in the centers of the sides E2 and E4, respectively. The connection electrode HE01 may be arranged at a position closer to the point P1 than to the point P2, and the connection electrode HE12 may be arranged at a position closer to the point P4 than to the point P3.

Figure 15:
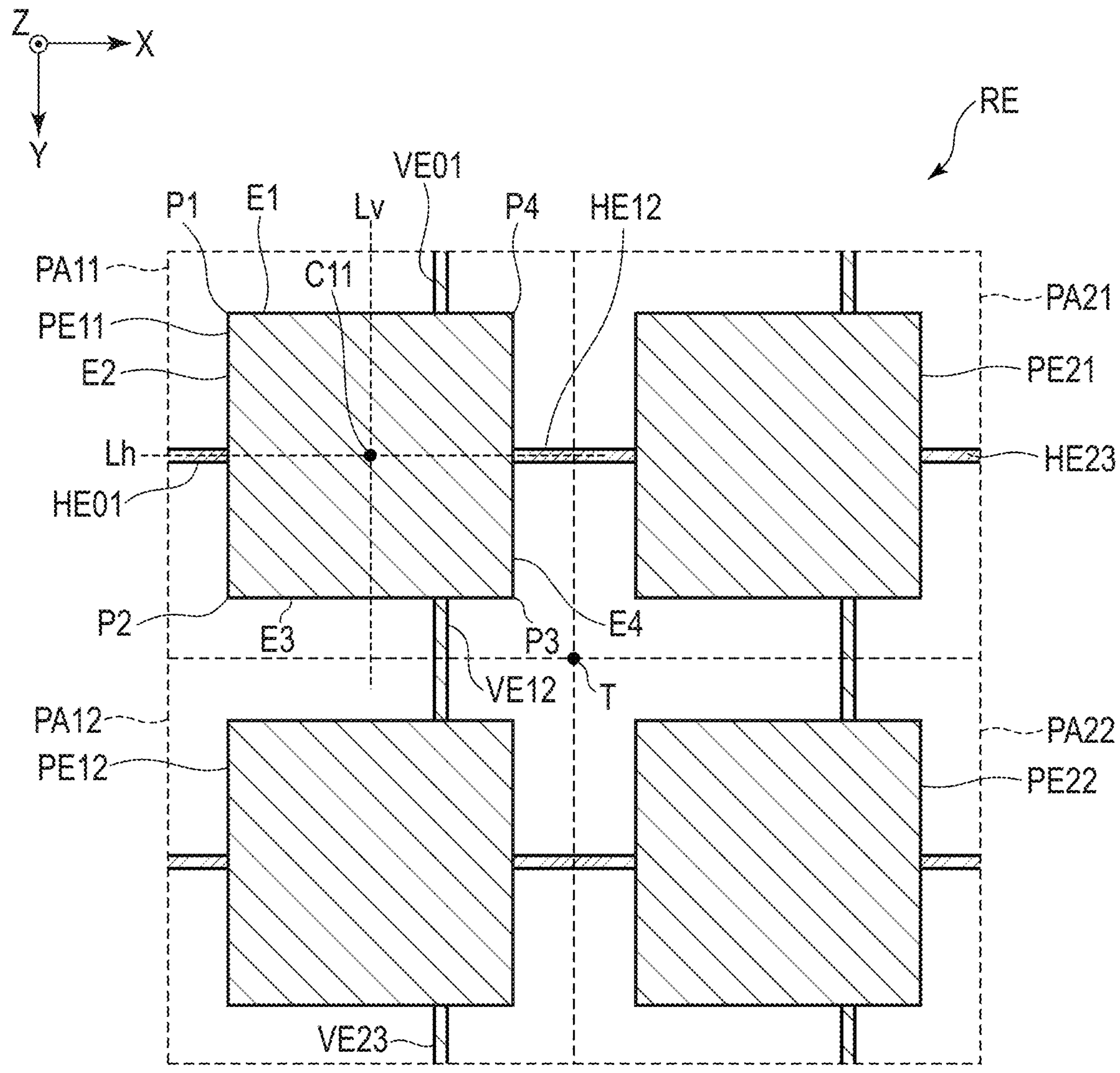
FIG. 15 is a plan view showing yet another configuration example of the intelligent reflecting surface of the embodiment.

FIG. 15 is a plan view showing yet another configuration example of the intelligent reflecting surface of the embodiment. The configuration example shown in FIG. 15 is different from the configuration example shown in FIG. 9 in that one of the connection electrode VE and the connection electrode HE is arranged at a position displaced from the center of the side.

In the intelligent reflecting surface RE shown in FIG. 15, the position of the connection electrode HE is the same as that in FIG. 9. In other words, the connection electrode HE01 and the connection electrode HE12 are straight electrodes or wires extending in a direction parallel to the first direction X, and overlap with the imaginary line Lh.

The connection electrode VE01 is not arranged in the center of the side E1. The connection electrode VE01 is arranged at a position which does not overlap with but is displaced from the imaginary line Lv. The connection electrode VE01 is not arranged at a position equidistant from the point P1 and the point P4, but is arranged at a position closer to the point P4 than to the point P1.

The connection electrode VE12 is not arranged in the center of the side E3. The connection electrode VE12 is arranged at a position which does not overlap with but is displaced from the imaginary line Lv. The connection electrode VE12 is not arranged at a position equidistant from the point P2 and the point P3, but is arranged at a position closer to the point P3 than to the point P2.

In other words, the connection electrode VE01 and the connection electrode VE12 are straight electrodes or wires extending in a direction parallel to the second direction Y, and are arranged at positions displaced from the imaginary line Lv.

However, the positions of the connection electrode VE01 and the connection electrode VE12 are not limited to the above as long as they are not arranged in the centers of the sides E1 and E2, respectively. The connection electrode VE01 may be arranged at a position closer to the point P1 than to the point P4, and the connection electrode VE12 may be arranged at a position closer to the point P2 than to the point P3.

In the configuration examples shown in FIG. 14 and FIG. 15, similarly to FIG. 2, when the intelligent reflecting surface RE is controlled for each patch electrode group GP, the connection electrodes VE may be integrally formed of the same conductors as the patch electrodes PE or may be formed of conductors different from each other. The connection electrode HE may not be connected to the patch electrode PE and may be a dummy electrode. In other words, the connection electrode HE may be in a floating state.

As shown in FIG. 6, when the intelligent reflecting surface RE is driven in an active matrix, the connection electrode HE may be the scanning line GL, and the connection electrode VE may be the signal line SL.

Incidentally, not the connection electrode HE, but the connection electrode VE may be used as a dummy electrode. In that case, a voltage may be applied to the patch electrode PE via the connection electrode HE. In other words, one of the connection electrode HE and the connection electrode VE may be used as an electrode to which a voltage is applied, and the other may be used as a dummy electrode.

In the configuration examples shown in FIG. 14 and FIG. 15, the patch area PA does not have rotational symmetry. After the rotation, however, the electrode shape also has symmetry in the horizontal polarization direction and the vertical polarization direction. Therefore, in the configuration examples shown in FIG. 14 and FIG. 15 as well, the reflection characteristics of the intelligent reflecting surface RE can be improved.

In the configuration example as well, the same advantages as those in the embodiment can be achieved.

Configuration Example 3

Figure 16:
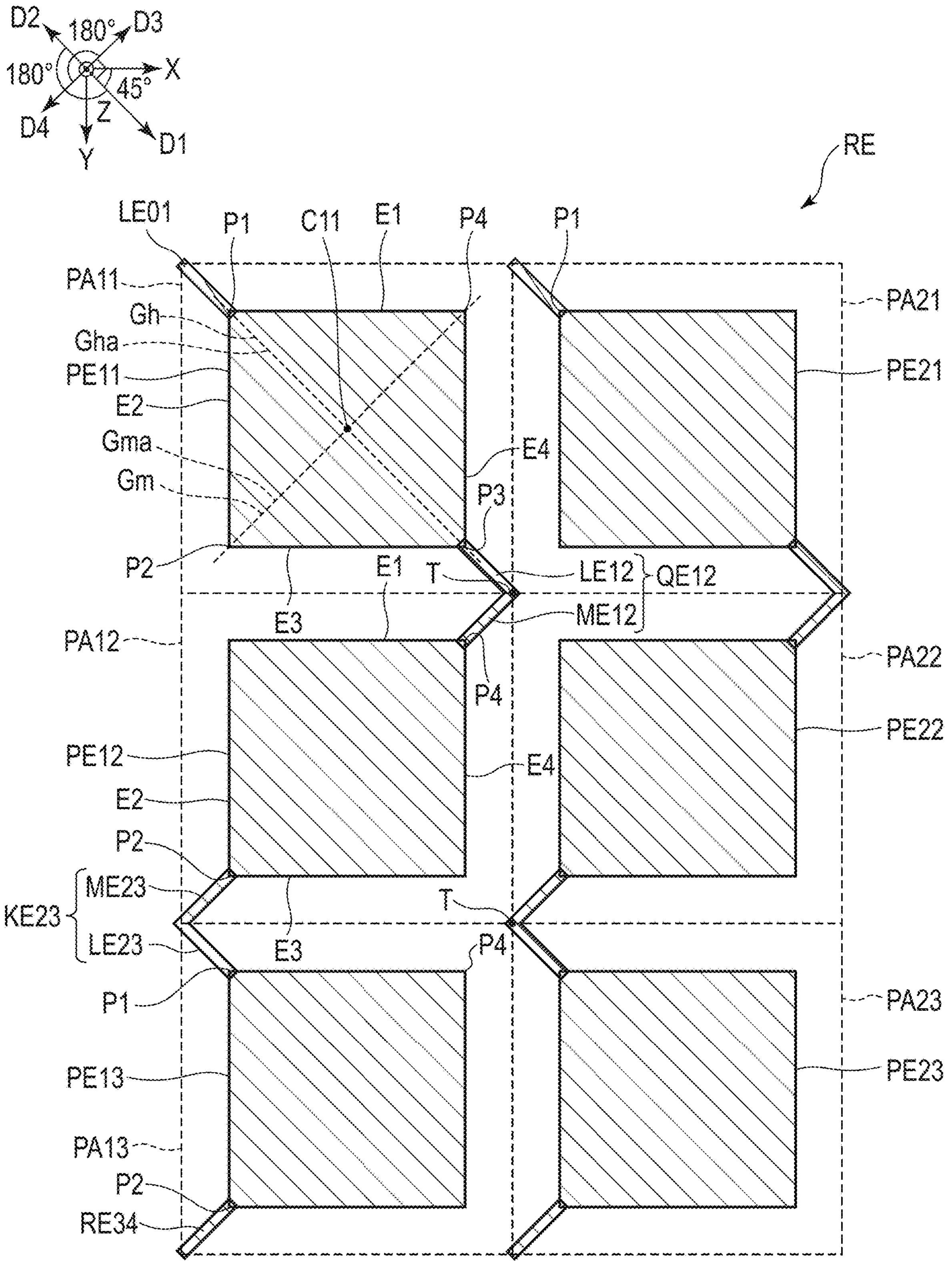
FIG. 16 is a plan view showing yet another configuration example of the intelligent reflecting surface of the embodiment.

FIG. 16 is a plan view showing yet another configuration example of the intelligent reflecting surface of the embodiment. The configuration example shown in FIG. 16 is different from the configuration example shown in FIG. 9 in that the electrodes connecting adjacent patch electrodes PE extend in an oblique direction.

In the example shown in FIG. 16, a direction inclined at 45° clockwise from the first direction X on the X-Y plane is referred to as direction D1. A direction inclined at 180° clockwise from the direction D1 on the X-Y plane is referred to as direction D2. The direction D1 and the direction D2 are directions parallel to each other, and one of them is a direction opposite to the other.

A direction orthogonal to the direction D1 is referred to D3, and a direction inclined at 180° clockwise from the direction D3 is referred to as D4. The direction D3 and the direction D4 are directions parallel to each other, and one of them is a direction opposite to the other. The directions D1 and D3 intersect at 90°.

In the intelligent reflecting surface RE shown in FIG. 16, connection electrodes connecting adjacent patch electrodes PE extend from points P (P1, P2, P3, and P4) of the patch electrodes PE. The connection electrodes extend along the direction D1 or the direction D2, or along the direction D3 or the direction D4.

The patch area PA11 includes the patch electrode PE11, a connection electrode LE01, and a connection electrode LE12. The connection electrode LE01 extends along the direction D2 from the point P1 which is the intersection of the side E1 and the side E2. The connection electrode LE12 extends along the direction D1 from the point P3 which is the intersection of the side E3 and the side E4. The connection electrode LE01 and the connection electrode LE12 are straight electrodes or wires extending in a direction parallel to the direction D1.

Of diagonal lines of the patch electrode PE, an imaginary line including a diagonal line Gma parallel to the direction D1 (direction D2) is referred to as Gm, and imaginary line Gh including a diagonal line Gha parallel to the direction D3 (direction D4). The connection electrode LE01 and the connection electrode LE12 overlap with the imaginary line Gh.

The patch area PA12 adjacent to the patch area PA11 in the second direction Y includes the patch electrode PE12, the connection electrode ME12, and the connection electrode ME23. The connection electrode ME12 extends along the direction D3 from the point P4 which is the intersection of the side E1 and the side E4. The connection electrode ME23 extends along the direction D4 from the point P2 which is the intersection of the side E2 and the side E3. The connection electrode ME12 and the connection electrode ME23 are straight electrodes or wires extending in a direction parallel to the direction D3. The connection electrode LE01 and the connection electrode LE12 overlap with the imaginary line Gm.

The connection electrode LE12 and the connection electrode ME12 are integrally formed to constitute a connection electrode KE12.

A row (referred to as a first row) of the patch areas PA which include the patch area PA11 and which are arranged along the first direction X has the same configuration as that of the patch area PA11. A row (referred to as a second row) of the patch areas PA which include the patch area PA12 and which are arranged along the first direction X has the same configuration as that of the patch area PA12.

A patch area PA13 has the same configuration as the patch area PA11. Although not shown, a patch area PA14 adjacent to the patch area PA13 in the second direction Y has the same configuration as the patch area PA12. In the intelligent reflecting surface RE of this configuration example, the first rows and the second rows are alternately arranged.

In the intelligent reflecting surface RE shown in FIG. 16, the electrode shape formed by the patch electrode PE, the connection electrode LE, and the connection electrode ME included in one patch area PA has rotational symmetry having the center point of the patch area PA as a center of rotation.

In the configuration example shown in FIG. 16, both the above-described electrode shape included in one patch area PA and the whole four patch areas PA have symmetry in the horizontal polarization direction and the vertical polarization direction. The reflection characteristics of the intelligent reflecting surface RE can be therefore improved.

Figure 17:
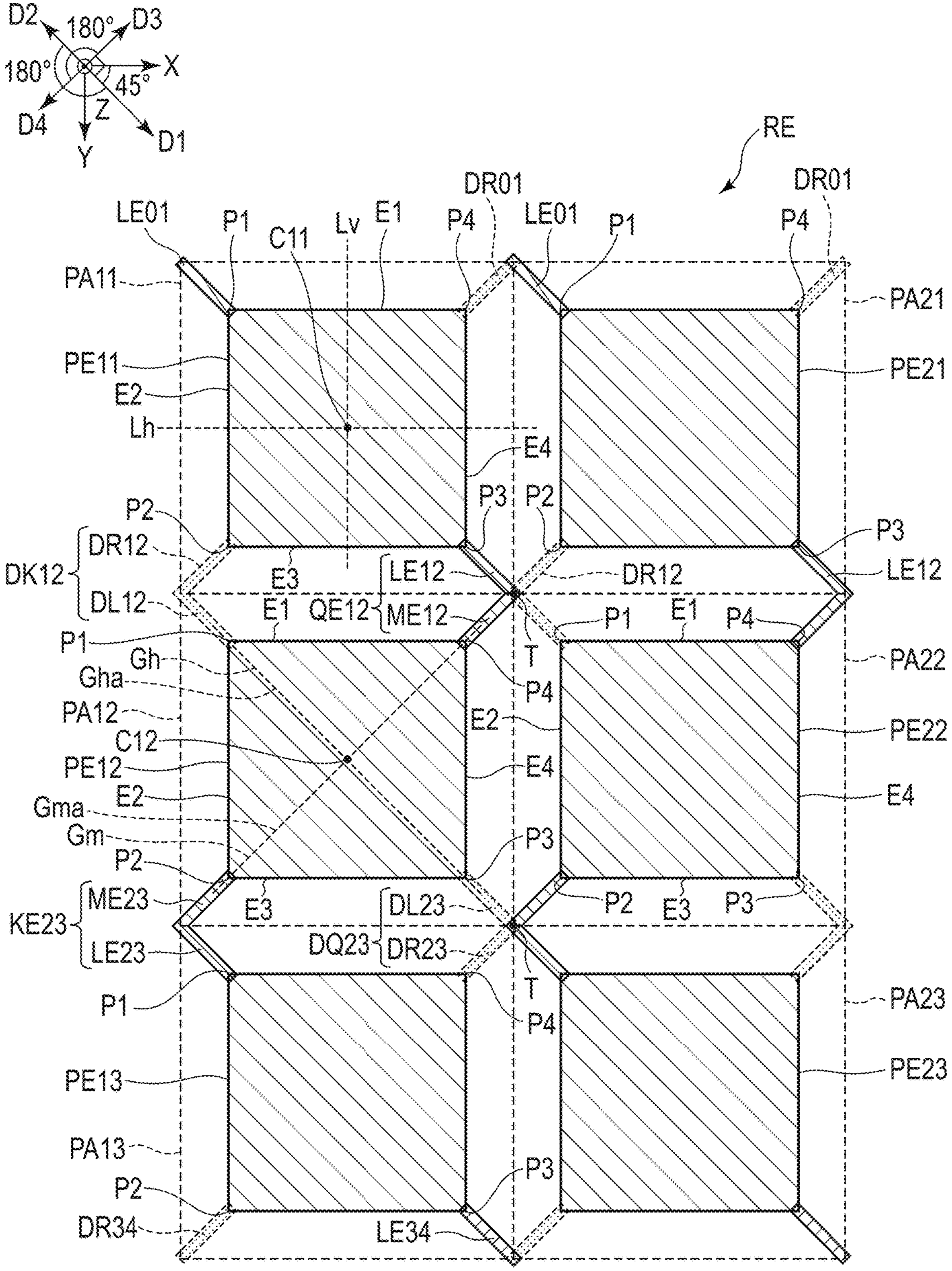
FIG. 17 is a plan view showing yet another configuration example of the intelligent reflecting surface of the embodiment.

FIG. 17 is a plan view showing yet another configuration example of the intelligent reflecting surface of the embodiment. The configuration example shown in FIG. 17 is different from the configuration example shown in FIG. 16 in that the dummy electrodes are arranged symmetrically with the connection electrodes extending in the oblique direction. In the intelligent reflecting surface RE shown in FIG. 17, similarly to FIG. 16, connection electrodes connecting adjacent patch electrodes PE extend from points P (P1, P2, P3, and P4) of the patch electrodes PE. The connection electrodes extend along the direction D1 or the direction D2, or along the direction D3 or the direction D4.

A dummy electrode extends from a point opposite to the point where the connection electrode extends. The dummy electrodes are arranged line-symmetrically with respect to the connection electrodes. As described above, the dummy electrodes may not be connected to the patch electrodes PE, but may be in a floating state.

The patch area PA11 includes the patch electrode PE11, the connection electrode LE01, the connection electrode LE12, a dummy electrode DR01, and a dummy electrode DR12.

The connection electrode LE01 extends from the point P1 along the direction D2. The connection electrode LE12 extends from the point P3 along the direction D1. The connection electrode LE01 and the connection electrode LE12 are straight electrodes or wires extending in a direction parallel to the direction D1. The connection electrode LE01 and the connection electrode LE12 overlap with the imaginary line Gh.

The dummy electrode DR01 extends from the point P4 along the direction D3. The dummy electrode DR12 extends from the point P2 along the direction D4. The dummy electrode DR01 and the dummy electrode DR12 are straight electrodes or wires extending in a direction parallel to the direction D3. The dummy electrode $d_l$01 and the dummy electrode $d_l$12 overlap with the imaginary line Gm.

The connection electrode LE01 and the dummy electrode DR01 are located line-symmetrically with respect to the imaginary line Lh. The connection electrode LE01 and the dummy electrode DR12 are located line-symmetrically with respect to the imaginary line Lv.

The patch area PA12 adjacent to the patch area PA11 in the second direction Y includes the patch electrode PE12, the connection electrode ME12, the connection electrode ME23, the dummy electrode $d_l$12, and a dummy electrode $d_l$23.

The connection electrode ME12 extends along the direction D3 from the point P4 which is the intersection of the side E1 and the side E4. The connection electrode ME23 extends along the direction D4 from the point P2 which is the intersection of the side E2 and the side E3. The connection electrode ME12 and the connection electrode ME23 are straight electrodes or wires extending in a direction parallel to the direction D3. The connection electrode ME12 and the connection electrode ME23 overlap with the imaginary line Gm.

The dummy electrode $d_l$12 extends from the point P1 along the direction D2. The dummy electrode $d_l$23 extends from the point P3 along the direction D1. The dummy electrode DR12 and the dummy electrode DR23 are straight electrodes or wires extending in a direction parallel to the direction D1. The dummy electrode $d_l$12 and the dummy electrode $d_l$23 overlap with the imaginary line Gh.

The connection electrode ME12 in the patch area PA12 is formed integrally with the connection electrode LE12 in the patch area PA11 to constitute a connection electrode QE12.

The dummy electrode $d_l$12 in the patch area PA12 may be formed integrally with or spaced apart from the dummy electrode DR12 in the patch area PA11. When integrally formed, the dummy electrode $d_l$12 and the dummy electrode DR12 constitute a dummy electrode $d_k$12.

The patch area PA13 adjacent to the patch area PA12 in the second direction Y includes a patch electrode PE13, a connection electrode LE23, a connection electrode LE34, the dummy electrode $d_l$23, and a dummy electrode DR34. A patch area PA13 has the same configuration as the patch area PA11.

The connection electrode LE23 extends from the point P1 along the direction D2. The connection electrode LE34 extends from the point P3 along the direction D1. The connection electrode LE23 and the connection electrode LE34 are straight electrodes or wires extending in a direction parallel to the direction D1. The connection electrode LE23 and the connection electrode LE34 overlap with the imaginary line Gh.

The dummy electrode DR23 extends from the point P4 along the direction D3. The dummy electrode DR34 extends from the point P2 along the direction D4. The dummy electrode DR23 and the dummy electrode DR34 are straight electrodes or wires extending in a direction parallel to the direction D3. The dummy electrode $d_l$23 and the dummy electrode $d_l$34 overlap with the imaginary line Gm.

The connection electrode LE23 in the patch area PA13 is formed integrally with the connection electrode ME23 in the patch area PA13 to constitute a connection electrode KE23.

The dummy electrode $d_l$23 in the patch area PA13 may be formed integrally with or spaced part from the dummy electrode DR23 in the patch area PA12. When integrally formed, the dummy electrode DR23 and the dummy electrode $d_l$23 constitute a dummy electrode DQ23.

A patch area PA21 adjacent to the patch area PA11 in the first direction X has the same configuration as the patch area PA11. The patch area PA21 includes the patch electrode PE21, the connection electrode LE01, the connection electrode LE12, the dummy electrode DR01, and the dummy electrode DR12. The connection electrode LE01 extends from the point P1 along the direction D2. The connection electrode LE12 extends from the point P3 along the direction D1. The connection electrode LE01 and the connection electrode LE12 are straight electrodes or wires extending in a direction parallel to the direction D1. The connection electrode LE01 and the connection electrode LE12 overlap with the imaginary line Gh.

The dummy electrode DR01 extends from the point P4 along the direction D3. The dummy electrode DR12 extends from the point P2 along the direction D4. The dummy electrode DR01 and the dummy electrode DR12 are straight electrodes or wires extending in a direction parallel to the direction D3. The dummy electrode $d_l$01 and the dummy electrode $d_l$12 overlap with the imaginary line Gm.

A patch area PA22 adjacent to the patch area PA21 in the second direction Y has the same configuration as the patch area PA12. However, the patch electrode PE12 in the patch area PA12 is replaced with the patch electrode PE22 in the patch area PA21.

In the intelligent reflecting surface RE shown in FIG. 17, the electrode shape formed by the patch electrode PE, the connection electrode LE, the connection electrode ME, the dummy electrode $d_l$, and the dummy electrode DR included in one patch area PA has rotational symmetry having the center point of the patch area PA as a center of rotation.

The four patch areas PA (patch area PA11, patch area PA12, patch area PA21, and patch area PA22) also have rotational symmetry having the intersection T of the whole four patch areas PA as the center of rotation.

In the configuration example shown in FIG. 17, both the above-described electrode shape included in one patch area PA and the whole four patch areas PA have symmetry in the horizontal polarization direction and the vertical polarization direction. The reflection characteristics of the intelligent reflecting surface RE can be therefore improved.

In FIG. 16 and FIG. 17, similarly to FIG. 2, when the intelligent reflecting surface RE is controlled for each patch electrode group GP, the connection electrodes LE and RE may be integrally formed of the same conductors as the patch electrodes PE or may be formed of conductors different from each other. In FIG. 17, the dummy electrode $d_l$ and the dummy electrode DR may be in a floating state.

In the configuration example as well, the same advantages as those in the embodiment can be achieved.

In the present disclosure, the direction D1 inclined at 45° clockwise from the first direction X and the direction D3 orthogonal to the direction D1 may also be referred to as a third direction and a fourth direction, respectively. The diagonal lines Gha and Gma may also be referred to as a first diagonal line and a second diagonal line, respectively. The imaginary lines Gh and Gm may also be referred to as a first imaginary line and a second imaginary line, respectively.

In FIG. 16 and FIG. 17, one of the connection electrodes LE extending in the direction parallel to the direction D1 from the patch electrode PE is referred to as a first connection electrode, and the other is referred to as a second connection electrode. One of the connection electrodes ME extending from the patch electrode PE in the direction parallel to the direction D3 is referred to as a first connection electrode, and the other is referred to as a second connection electrode.

In FIG. 16 and FIG. 17, for example, the connection electrode LE01 extending along the direction D2 from the point P1, which is the vertex of the patch electrode PE11, is referred to as a first connection electrode of the patch area PA11. The connection electrode LE12 extending along the direction D1 from the point P3, which is the vertex of the patch electrode PE11, is referred to as a second connection electrode of the patch area PA11. In the patch area PA12 adjacent to the patch area PA11 in the second direction Y, the connection electrode ME12 extending along the direction D3 from the point P4, which is the vertex of the patch electrode PE12, is referred to as a first connection electrode of the patch area PA12. The connection electrode ME23 extending along the direction D4 from the point P2, which is the vertex of the patch electrode PE12, is referred to as a second connection electrode of the patch area PA12.

Configuration Example 4

Figure 18:
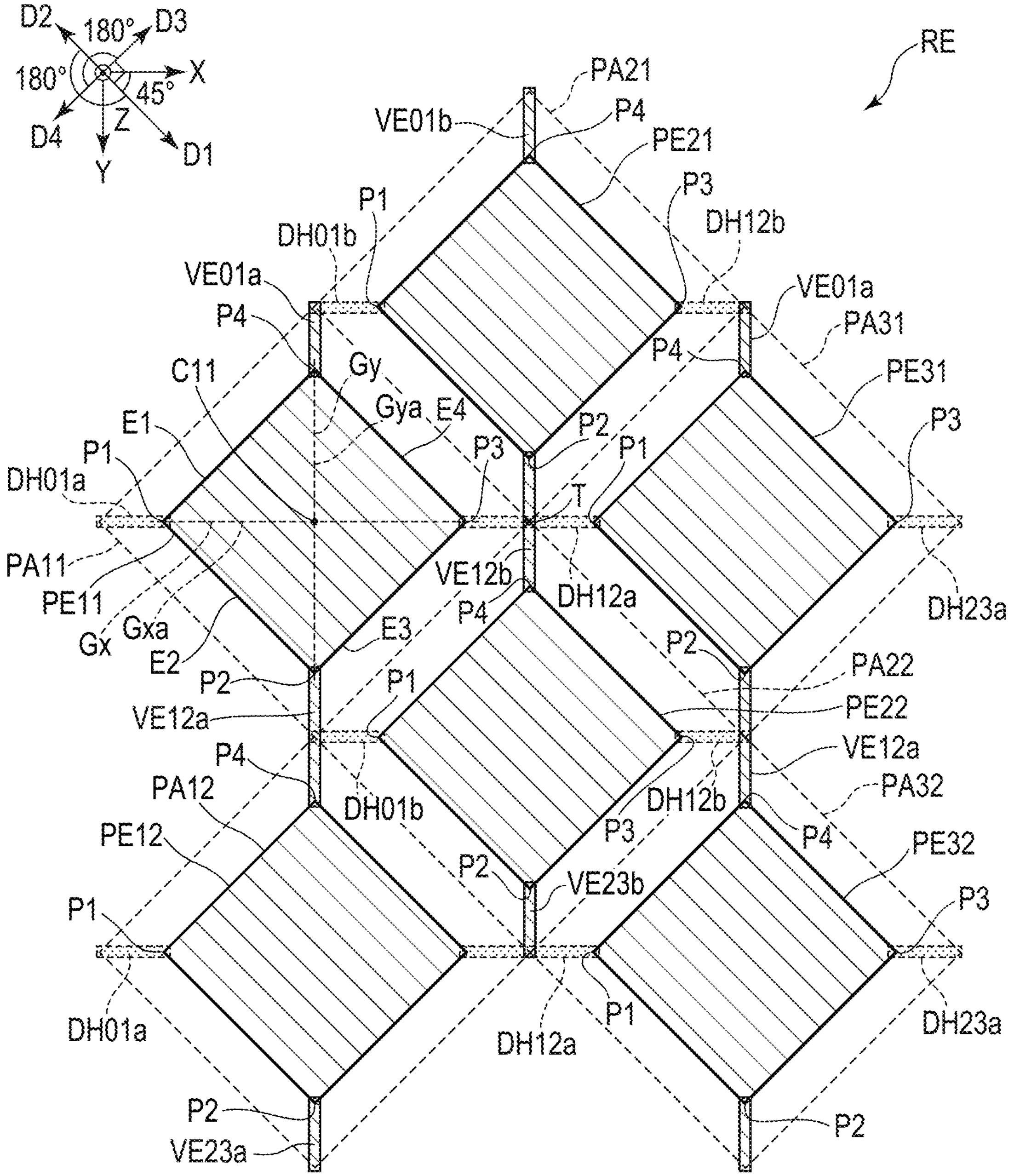
FIG. 18 is a plan view showing yet another configuration example of the intelligent reflecting surface of the embodiment.

FIG. 18 is a plan view showing yet another configuration example of the intelligent reflecting surface of the embodiment. The configuration example shown in FIG. 17 is different from the configuration example shown in FIG. 9 in that patch electrodes are arranged along an oblique direction.

FIG. 18 is a plan view showing the intelligent reflecting surface RE of the configuration example. A plurality of square patch electrodes PE are arrayed in a matrix along the direction D1 and the direction D3, on the intelligent reflecting surface RE. Of the diagonal lines of the patch electrode PE, an imaginary line including a diagonal line Gxa parallel to the first direction X is referred to as Gx, and an imaginary line including a diagonal line Gya parallel to the second direction Y is referred to as Gy.

The intelligent reflecting surface RE shown in FIG. 18 includes the patch area PA11, the patch area PA12 the patch area PA21, the patch area PA22, a patch area PA31, and a patch area PA32. The patch area PA11 and the patch area PA31 are arranged adjacent to each other in the first direction X. The patch area PA12 and the patch area PA32 are arranged adjacent to each other in the first direction X.

The patch area PA11 and the patch area PA12 are arranged adjacent to each other in the second direction Y. The patch area PA21 and the patch area PA22 are arranged adjacent to each other in the second direction Y. The patch area PA31 and the patch area PA32 are arranged adjacent to each other in the second direction Y.

The patch area PA11, the patch area PA22, and the patch area PA32 are arranged adjacent to each other along direction D1 (or direction D2). The patch area PA21 and the patch area PA31 are arranged adjacent to each other along direction D1 (or direction D2).

The patch area PA11 and the patch area PA21 are arranged adjacent to each other along direction D3 (or direction D4). The patch area PA12, the patch area PA22, and the patch area PA31 are arranged adjacent to each other along direction D3 (or direction D4).

The patch area PA11 includes the patch electrode PE11, a connection electrode VE01*a*, a connection electrode VE12*a*, a dummy electrode DH01*a*, and a dummy electrode DH12*a*. The connection electrode VE01*a* extends from the point P4 along a direction parallel to the second direction Y. The connection electrode VE12*a* extends from the point P2 along the second direction Y and is connected to the patch electrode PE12 of the patch area PA12. The connection electrode VE01*a* and the connection electrode VE12*a* are straight electrodes or wires extending in a direction parallel to the second direction Y. The connection electrode LE01*a* and the connection electrode LE12*a* overlap with the imaginary line Gy.

The dummy electrode DH01*a* extends from the point P1 along a direction parallel to the first direction X. The dummy electrode DH12*a* extends from the point P3 along the first direction X. The dummy electrode DH12*a* may reach the patch area PA31. The dummy electrode DH01*a* and the dummy electrode DH12*a* are straight electrodes or wires extending in a direction parallel to the first direction X. The dummy electrode DH01*a* and the dummy electrode DH12*a* overlap with the imaginary line Gx.

The patch area PA12 includes the patch electrode PE12, the connection electrode VE12*a*, a connection electrode VE23*a*, a dummy electrode DH01*a*, and a dummy electrode DH12*a*.

The connection electrode VE12*a* extends from the point P4 along a direction parallel to the second direction Y. The connection electrode VE23*a* extends from the point P2 along the second direction Y. The connection electrode VE12*a* and the connection electrode VE23*a* are straight electrodes or wires extending in a direction parallel to the second direction Y. The connection electrode VE12*a* and the connection electrode VE23*a* overlap with the imaginary line Gy.

The dummy electrode DH01*a* extends from the point P1 along a direction parallel to the first direction X. The dummy electrode DH12*a* extends from the point P3 along the first direction X. The dummy electrode DH12*a* may reach the patch area PA32.

The patch area PA21 includes the patch electrode PE21, a connection electrode VE01*b*, a connection electrode VE12*b*, a dummy electrode DH01*b*, and a dummy electrode DH12*b*.

The connection electrode VE01*b* extends from the point P4 along a direction parallel to the second direction Y. The connection electrode VE12*b* extends from the point P2 along the second direction Y and is connected to the patch electrode PE22. The connection electrode VE01*b* and the connection electrode VE12*b* are straight electrodes or wires extending in a direction parallel to the second direction Y. The connection electrode VE01*b* and the connection electrode VE12*b* overlap with the imaginary line Gy.

The dummy electrode DH01*b* extends from the point P1 along a direction parallel to the first direction X. The dummy electrode DH12*b* extends from the point P3 along the first direction X. The dummy electrode DH01*b* and the dummy electrode DH12*b* are straight electrodes or wires extending in a direction parallel to the first direction X. The dummy electrode DH01*b* and the dummy electrode DH12*b* overlap with the imaginary line Gx.

The patch area PA22 includes the patch electrode PE22, the connection electrode VE12*b*, the connection electrode VE12*b*, the dummy electrode DH01*b*, and the dummy electrode DH12*b*.

The connection electrode VE12*b* extends from the point P4 along a direction parallel to the second direction Y and is connected to the patch electrode PE21. The connection electrode VE23*b* extends from the point P2 along the second direction Y. The connection electrode VE12*b* and the connection electrode VE23*b* are straight electrodes or wires extending in a direction parallel to the second direction Y. The connection electrode VE12*b* and the connection electrode VE23*b* overlap with the imaginary line Gy.

The dummy electrode DH01*b* extends from the point P1 along a direction parallel to the first direction X. The dummy electrode DH12*b* extends from the point P3 along the first direction X.

The patch area PA31 includes a patch electrode PE31, the connection electrode VE01*a*, the connection electrode VE12*a*, the dummy electrode DH12*a*, and the dummy electrode DH23*a*.

The connection electrode VE01*a* extends from the point P4 along a direction parallel to the second direction Y. The connection electrode VE12*a* extends from the point P2 along the second direction Y and is connected to the patch electrode PE32 in the patch area PA32.

The dummy electrode DH12*a* extends from the point P1 along a direction parallel to the first direction X. The dummy electrode DH12*a* may reach the patch area PA11. The dummy electrode DH23*a* extends from the point P3 along the first direction X. The dummy electrode DH12*a* and the dummy electrode DH23*a* are straight electrodes or wires extending in a direction parallel to the first direction X. The dummy electrode DH12*a* and the dummy electrode DH23*a* overlap with the imaginary line Gx.

The patch area PA32 includes the patch electrode PE32, the connection electrode VE12*a*, the connection electrode VE23*a*, the dummy electrode DH12*a*, and the dummy electrode DH23*a*.

The connection electrode VE12*a* extends from the point P4 along a direction parallel to the second direction Y and is connected to the patch electrode PE31 in the patch area PA31. The connection electrode VE23*a* extends from the point P2 along the second direction Y.

The dummy electrode DH12*a* extends from the point P1 along a direction parallel to the first direction X. The dummy electrode DH12*a* may reach the patch area PA12. The dummy electrode DH23*a* extends from the point P3 along the first direction X.

The connection electrodes VE (connection electrode VE01*a*, connection electrode VE12*a*, connection electrode VE23*a*, connection electrode VE01*b*, connection electrode VE12*b*, and connection electrode VE23*b*) and the dummy electrodes DH (dummy electrode DH01*a*, dummy electrode DH12*a*, dummy electrode DH23*a*, dummy electrode DH01*b*, and dummy electrode DH12*b*) are desirably spaced apart via an insulating layer in cross-sectional view.

In the configuration example, the patch areas PA are arranged along the direction D1, the direction D2, the direction D3, and the direction D4 forming an angle of 45° with the first direction X and the second direction Y. The patch electrodes PE included in the patch areas PA are similarly arranged along the direction forming 45° with the first direction X and the second direction Y.

FIG. 18 exemplifies parts of a plurality of patch areas PA. Six patch areas PA are shown in the intelligent reflecting surface RE shown in FIG. 17, but the number of patch areas PA is not limited to this.

In FIG. 18, similarly to FIG. 2, when the intelligent reflecting surface RE is controlled for each patch electrode group GP, the connection electrodes VE may be integrally formed of the same conductors as the patch electrodes PE or may be formed of conductors different from each other. The dummy electrode DH may be in a floating state.

In the configuration example as well, the same advantages as those in the embodiment can be achieved.

In the present disclosure, the direction D1 and the direction D3 shown in FIG. 18 are referred to as a first direction and a second direction, respectively. In this case, the first direction X and the second direction Y are referred to as a third direction and a fourth direction, respectively.

The diagonal lines Gya and Gxa are referred to as a first diagonal line and a second diagonal line, respectively. The imaginary lines Gy and Gx are referred to as a first imaginary line and a second imaginary line, respectively.

In FIG. 18, for example, the patch area PA12, the patch area PA11, and the patch area PA32 are referred to as a first patch area, a second patch area, and a third patch area, respectively. The patch area PA12 (first patch area) and the patch area PA11 (second patch area) are adjacent to each other in a direction parallel to the direction D1 (first direction). The patch area PA12 (first patch area) and the patch area PA32 (third patch area) are adjacent to each other in a direction parallel to the direction D3 (second direction).

In FIG. 18, the connection electrode VE12*a* and the connection electrode VE23*a* in the patch area PA12 are referred to as a first connection electrode and a second connection electrode in the first patch area. The connection electrode VE01*a* and the connection electrode VE12*a* in the patch area PA11 are referred to as a first connection electrode and a second connection electrode in the first patch area. The connection electrodes VE12*a* in the patch area PA12 and the connection electrodes VE12*a* in the patch area PA11 are integrally formed.

In FIG. 18, the dummy electrode DH01*a* and the dummy electrode DH12*a* in the patch area PA12 are referred to as a first dummy electrode and a second dummy electrode in the first patch area. The dummy electrode DH12*a* and the dummy electrode DH23*a* in the patch area PA32 are referred to as a first dummy electrode and a second dummy electrode in the third patch area. The dummy electrode DH12*a* in the patch area PA12 and the dummy electrode DH12*a* in the patch area PA32 are integrally formed.

Configuration Example 5

Figure 19A:
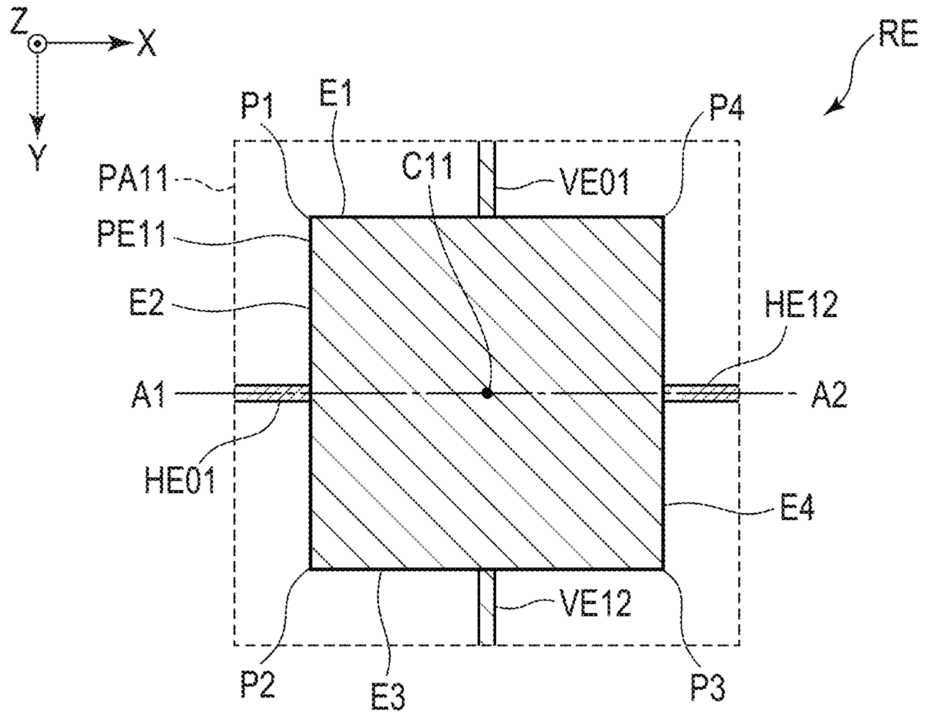
FIG. 19A is a plan view showing yet another configuration example of the intelligent reflecting surface of the embodiment.
Figure 19B:
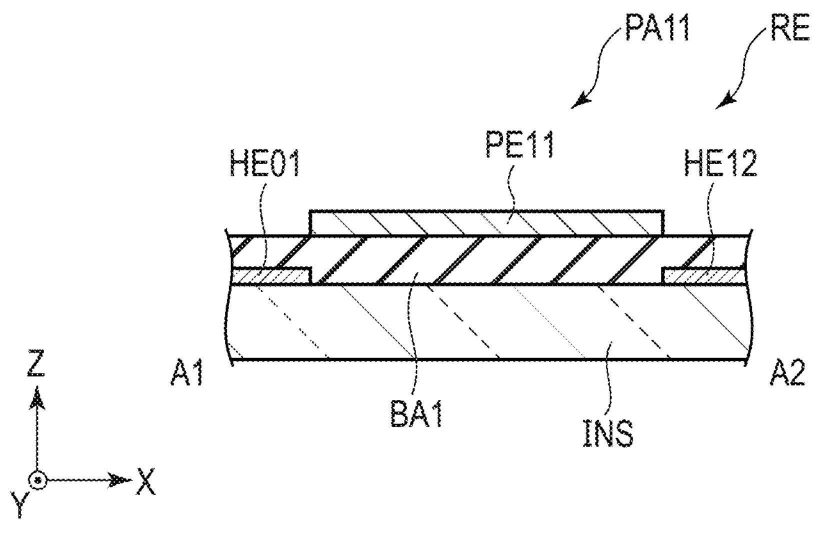
FIG. 19B is a plan view showing yet another configuration example of the intelligent reflecting surface of the embodiment.

FIG. 19A and FIG. 19B are views showing yet another configuration example of the intelligent reflecting surface of the embodiment. The configuration example shown in FIG. 19A and FIG. 19B is different from the configuration example shown in FIG. 1 in that the patch electrodes and the dummy electrodes are spaced apart via an insulating layer.

FIG. 19A is a plan view showing the patch area PA11 in FIG. 9. FIG. 19B is a cross-sectional view showing the intelligent reflecting surface RE along line A1-A2 in FIG. 19A.

In the intelligent reflecting surface RE shown in FIG. 19B, the connection electrode HE01 and the connection electrode HE02 are provided on the base BA1. An insulating layer INS is provided to cover the connection electrode HE01 and the connection electrode HE02. The insulating layer INS may be formed of an inorganic insulating material or an organic insulating material. The patch electrode PE is provided on the insulating layer INS.

When the connection electrode HE is a dummy electrode, the connection electrode HE may be in a floating state.

In the intelligent reflecting surface RE shown in FIG. 17, the dummy electrodes DR (dummy electrode DR01, dummy electrode DR12, and dummy electrode DR23) and the dummy electrodes $d_l$ (dummy electrode $d_l$01, dummy electrode $d_l$12, and dummy electrode $d_l$23) may be replaced with the connection electrodes HE (connection electrode HE01 and connection electrode HE12) shown in FIG. 19B.

In the intelligent reflecting surface RE shown in FIG. 18, the dummy electrode DH may be replaced with the connection electrode HE shown in FIG. 19B.

Figure 20:
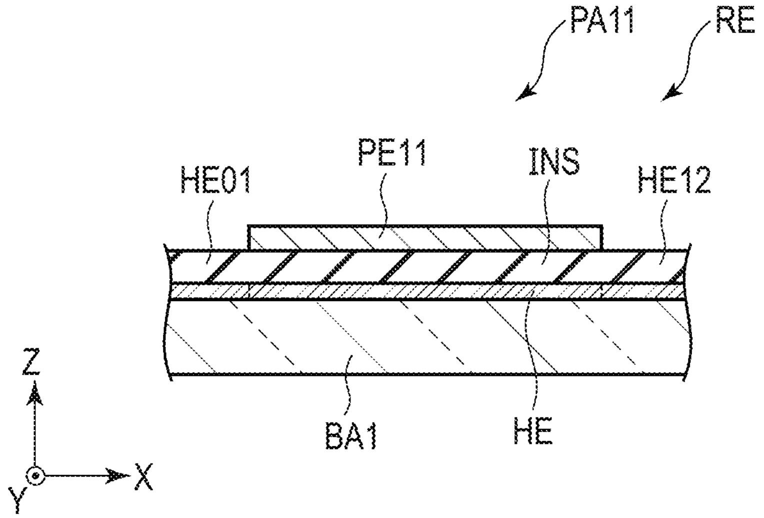
FIG. 20 is a plan view showing yet another configuration example of the intelligent reflecting surface of the embodiment.

FIG. 20 is a plan view showing yet another configuration example of the intelligent reflecting surface of the embodiment. The configuration example shown in FIG. 20 is different from the configuration example shown in FIG. 19A and FIG. 19B in that the dummy electrodes are formed integrally with each other.

In the intelligent reflecting surface RE shown in FIG. 20, the connection electrode HE01 and the connection electrode HE12, which are dummy electrodes, are integrally formed to constitute one connection electrode HE. The connection electrode HE may be connected to another connection electrode HE provided in the patch area PA arranged adjacent.

Figure 21:
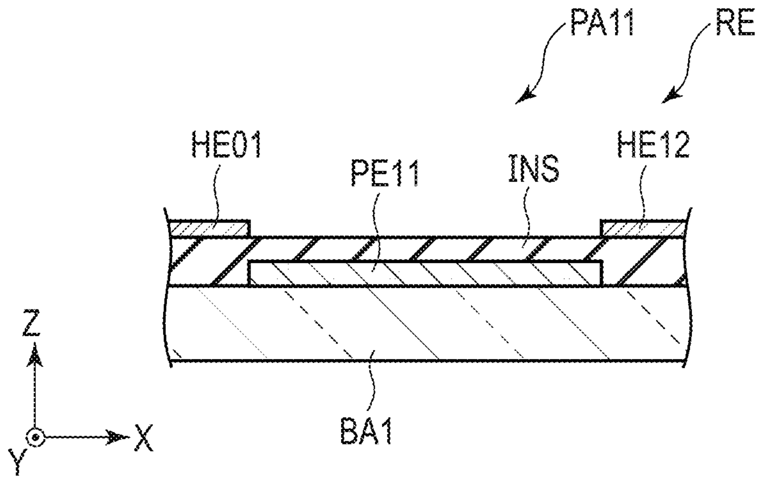
FIG. 21 is a plan view showing yet another configuration example of the intelligent reflecting surface of the embodiment.

FIG. 21 is a plan view showing yet another configuration example of the intelligent reflecting surface of the embodiment. The configuration example shown in FIG. 21 is different from the configuration example shown in FIG. 20 in that the dummy electrode is provided above the patch electrode.

In the intelligent reflecting surface RE shown in FIG. 21, the patch electrode PE is provided on the base BA1. Incidentally, an insulating layer (not shown) may be provided between the base BA1 and the patch electrode PE. The insulating layer INS is provided to cover the patch electrode PE. The connection electrodes HE01 and HE02 are provided on the insulating layer INS.

Figure 22A:
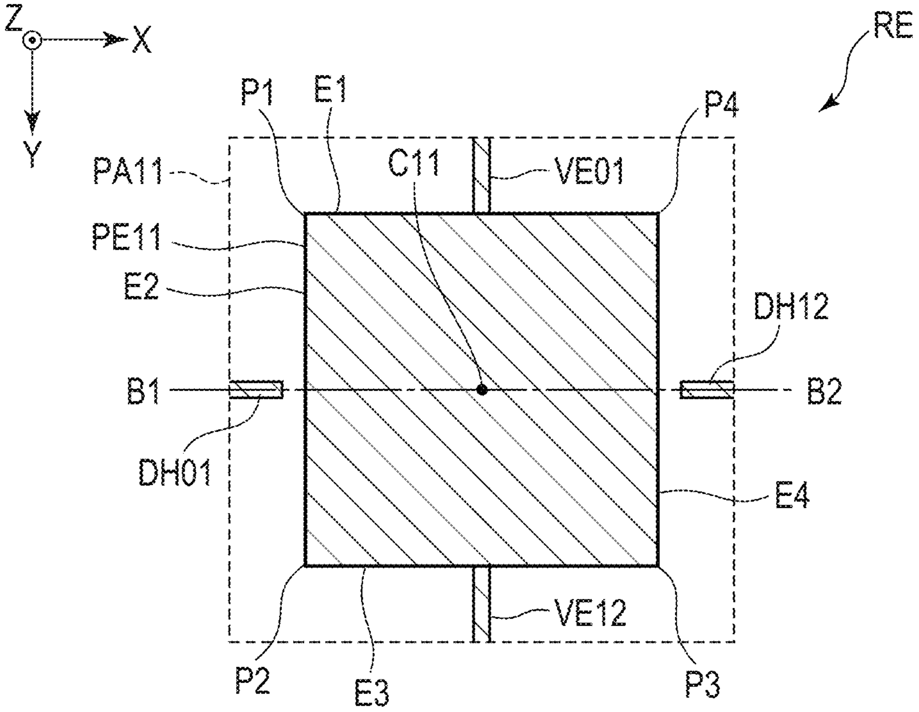
FIG. 22A is a plan view showing yet another configuration example of the intelligent reflecting surface of the embodiment.
Figure 22B:
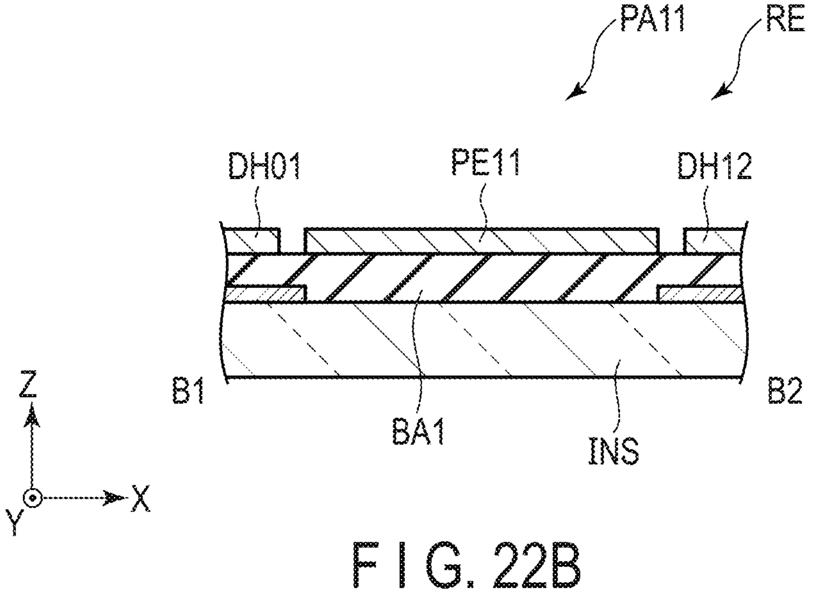
FIG. 22B is a plan view showing yet another configuration example of the intelligent reflecting surface of the embodiment.

FIG. 22A and FIG. 22B are views showing yet another configuration example of the intelligent reflecting surface of the embodiment. The configuration example shown in FIG. 22A and FIG. 22B is different from the configuration example shown in FIG. 20 in that the dummy electrode is provided in the same layer as the patch electrode.

FIG. 22A is a plan view showing the patch area PA11, and FIG. 22B is a cross-sectional view showing the intelligent reflecting surface RE along line B1-B2 in FIG. 22A. In the intelligent reflecting surface RE shown in FIG. 22A and FIG. 22B, the insulating layer INS is provided on the base BA1. The patch electrode PE, and the connection electrode HE01 and the connection electrode HE12 which are dummy electrodes, are provided on the insulating layer INS. The patch electrode PE and the connection electrodes HE (connection electrode HE01 and connection electrode HE12) are provided to be spaced apart on the X-Y plane and are not connected. The connection electrode HE may be in a floating state.

In the configuration example as well, the same advantages as those in the embodiment can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An intelligent reflecting surface comprising:

a first substrate including a first base, and a plurality of patch areas including a plurality of square patch electrodes arrayed in a matrix at regular intervals along each of a first direction and a second direction;

a second substrate including a second base and a common electrode opposed to the plurality of square patch electrodes; and a liquid crystal layer sandwiched between the first substrate and the second substrate, wherein both the plurality of square patch electrodes and the common electrode are made of metal, each of the plurality of patch areas includes the square patch electrode, a first connection electrode, a second connection electrode, a third connection electrode, and a fourth connection electrode, each of the first connection electrode, the second connection electrode, the third connection electrode, and the fourth connection electrode extends from sides of the square patch electrode, the first connection electrode and the third connection electrode extend parallel to the second direction, the second connection electrode and the fourth connection electrode extend parallel to the first direction, the first connection electrode and the third connection electrode are arranged linearly to extend in directions opposite to each other, the second connection electrode and the fourth connection electrode are arranged linearly to extend in directions opposite to each other, an electrode shape formed by the square patch electrode, the first connection electrode, the second connection electrode, the third connection electrode, and the fourth connection electrode included in each of the plurality of patch areas has rotational symmetry having a point inside each of the plurality of patch areas as a center of rotation, and a first patch area, a second patch area adjacent to the first patch area in the second direction, a third patch area adjacent to the first patch area in the first direction, and a fourth patch area adjacent to the second patch area in the first direction and adjacent to the third patch area in the second direction, of the plurality of patch areas, have an intersection of the first patch area, the second patch area, the third patch area, and the fourth patch area as a whole as a center of rotation.

2. The intelligent reflecting surface according to claim 1, wherein the first connection electrode and the third connection electrode, or the second connection electrode and the fourth connection electrode are in a floating state.

3. The intelligent reflecting surface according to claim 1, wherein a length in the second direction of each of the second connection electrode and the fourth connection electrode is larger than a length in the first direction of each of the first connection electrode and the third connection electrode.

4. An intelligent reflecting surface comprising:

a first substrate including a first base, and a plurality of patch areas including a plurality of square patch electrodes arrayed in a matrix at regular intervals along each of a first direction and a second direction;

a second substrate including a second base and a common electrode opposed to the plurality of square patch electrodes; and a liquid crystal layer sandwiched between the first substrate and the second substrate, wherein both the plurality of square patch electrodes and the common electrode are made of metal, each of the plurality of patch areas includes the square patch electrode, a first connection electrode, a second connection electrode, a third connection electrode, and a fourth connection electrode, each of the first connection electrode, the second connection electrode, the third connection electrode, and the fourth connection electrode extend from sides of the square patch electrode, the first connection electrode and the third connection electrode extend parallel to the second direction, the second connection electrode and the fourth connection electrode extend parallel to the first direction, the first connection electrode and the third connection electrode are arranged linearly to extend in directions opposite to each other, the second connection electrode and the fourth connection electrode are arranged linearly to extend in directions opposite to each other, a line passing through a center point of the square patch electrode and extending along the second direction is referred to as a first imaginary line, and a line passing through the center point and extending along the first direction is referred to as a second imaginary line, and at least one of a condition that the first connection electrode and the third connection electrode do not overlap with the first imaginary line and a condition that the second connection electrode and the fourth connection electrode do not overlap with the second imaginary line is satisfied.

5. The intelligent reflecting surface according to claim 4, wherein the first connection electrode and the third connection electrode, or the second connection electrode and the fourth connection electrode are in a floating state.

6. The intelligent reflecting surface according to claim 4, wherein the first connection electrode and the third connection electrode do not overlap with the first imaginary line, and the second connection electrode and the fourth connection electrode do not overlap with the second imaginary line.

7. The intelligent reflecting surface according to claim 4, wherein the square patch electrode has a first side and a third side which extend in a direction parallel to the first direction, and a second side and a fourth side which extend in a direction parallel to the second direction, the first connection electrode extends from a position displaced from a center of the first side, the second connection electrode extends from a position displaced from a center of the second side, the third connection electrode extends from a position displaced from a center of the third side, and the fourth connection electrode extends from a position displaced from a center of the fourth side.

8. The intelligent reflecting surface according to claim 4, wherein the first connection electrode and the third connection electrode overlap with the first imaginary line, and the second connection electrode and the fourth connection electrode do not overlap with the second imaginary line.

9. The intelligent reflecting surface according to claim 4, wherein the square patch electrode has a first side and a third side which extend in a direction parallel to the first direction, and a second side and a fourth side which extend in a direction parallel to the second direction, the first connection electrode extends from a center of the first side, the second connection electrode extends from a position displaced from a center of the second side, the third connection electrode extends from a center of the third side, and the fourth connection electrode extends from a position displaced from a center of the fourth side.

10. The intelligent reflecting surface according to claim 4, wherein the first connection electrode and the third connection electrode do not overlap with the first imaginary line, and the second connection electrode and the fourth connection electrode overlap with the second imaginary line.

11. The intelligent reflecting surface according to claim 4, wherein the square patch electrode has a first side and a third side which extend in a direction parallel to the first direction, and a second side and a fourth side which extend in a direction parallel to the second direction, the first connection electrode extends from a position displaced from a center of the first side, the second connection electrode extends from a center of the second side, the third connection electrode extends from a position displaced from a center of the third side, and the fourth connection electrode extends from a center of the fourth side.

12. An intelligent reflecting surface comprising:

a first substrate including a first base, and a plurality of patch areas including a plurality of square patch electrodes arrayed in a matrix at regular intervals along each of a first direction and a second direction;

a second substrate including a second base and a common electrode opposed to the plurality of square patch electrodes; and a liquid crystal layer sandwiched between the first substrate and the second substrate, wherein both the plurality of square patch electrodes and the common electrode are made of metal, each of the plurality of patch areas includes the square patch electrode, and a first connection electrode, and a second connection electrode which extend from vertices of the square patch electrode, and the first connection electrode and the second connection electrode are arranged linearly, extend in directions opposite to each other, and overlap with an imaginary line including one of diagonal lines of the square patch electrode.

13. The intelligent reflecting surface according to claim 12, wherein the plurality of patch areas include a first patch area, and a second patch area adjacent to the first patch area in the second direction, the first connection electrode and the second connection electrode in the first patch area overlap with a first imaginary line including a first diagonal line of the square patch electrode, the first connection electrode and the second connection electrode in the second patch area overlap with a second imaginary line including a second diagonal line of the square patch electrode, and the second connection electrode in the first patch area and the first connection electrode in the second patch area, or the first connection electrode in the first patch area and the first connection electrode in the second patch area are formed integrally.

14. The intelligent reflecting surface according to claim 12, wherein the plurality of patch areas include a first patch area, and a second patch area adjacent to the first patch area in the second direction, the first connection electrode and the second connection electrode in the first patch area extend in a direction parallel to a third direction forming 45° with the first direction, the first connection electrode and the second connection electrode in the second patch area extend in a fourth direction orthogonal to the third direction, and the second connection electrode in the first patch area and the first connection electrode in the second patch area, or the first connection electrode in the first patch area and the first connection electrode in the second patch area are formed integrally.

15. The intelligent reflecting surface according to claim 12, further comprising:

a first dummy electrode and a second dummy electrode which overlap with an imaginary line including the other one of the diagonal lines of the square patch electrode.

16. The intelligent reflecting surface according to claim 13, wherein each of the first patch area and the second patch area includes a first dummy electrode and a second dummy electrode, the first dummy electrode and the second dummy electrode in the first patch area overlap with the second imaginary line, the first dummy electrode and the second dummy electrode in the second patch area overlap with the first imaginary line, and the second dummy electrode in the first patch area and the first dummy electrode in the second patch area, or the first dummy electrode in the first patch area and the first dummy electrode in the second patch area are formed integrally.

17. The intelligent reflecting surface according to claim 12, wherein the plurality of patch areas include a first patch area, a second patch area adjacent to the first patch area in a direction parallel to a third direction forming 45° with the first direction, and a third patch area adjacent to the first patch area in a direction parallel to a fourth direction orthogonal to the third direction, the first connection electrode and the second connection electrode in each of the first patch area and the second patch area overlap with a first imaginary line including a first diagonal line of the square patch electrode, the second connection electrode in the first patch area and the first connection electrode in the second patch area, or the first connection electrode in the first patch area and the first connection electrode in the second patch area are formed integrally, each of the first patch area and the third patch area includes a first dummy electrode and a second dummy electrode, the first dummy electrode and the second dummy electrode in each of the first patch area and the third patch area overlap with a second imaginary line including a second diagonal line of the square patch electrode, and the second dummy electrode in the first patch area and the first dummy electrode in the second patch area, or the first dummy electrode in the first patch area and the first dummy electrode in the second patch area are formed integrally.

* * * * *